(12) United States Patent
Nakamura

(10) Patent No.: US 10,175,507 B2
(45) Date of Patent: Jan. 8, 2019

(54) LOUPE MOUNTING POSITION DETERMINATION METHOD IN BINOCULAR LOUPE DEVICE, AND SYSTEM

(71) Applicant: Shoichi Nakamura, Nagano-ken (JP)

(72) Inventor: Shoichi Nakamura, Nagano-ken (JP)

(73) Assignees: Shoichi Nakamura, Higashichikuma-Gun, Nagano-Ken (JP); ACP JAPAN CO., LTD., Tokyo (JP)

( * ) Notice: Subject to any disclaimer, the term of this patent is extended or adjusted under 35 U.S.C. 154(b) by 0 days.

(21) Appl. No.: 15/608,347

(22) Filed: May 30, 2017

(65) Prior Publication Data

US 2018/0348542 A1 Dec. 6, 2018

(51) Int. Cl.
| | |
|---|---|
| *G02B 25/00* | (2006.01) |
| *G02C 7/08* | (2006.01) |
| *G02C 7/06* | (2006.01) |
| *G02B 7/02* | (2006.01) |

(52) U.S. Cl.
CPC .......... *G02C 7/083* (2013.01); *G02C 7/061* (2013.01); *G02C 7/088* (2013.01); *G02B 7/022* (2013.01); *G02C 2202/06* (2013.01)

(58) Field of Classification Search
CPC .. G02B 25/001; G02B 25/002; G02B 25/004; G02B 25/005; G02B 25/007; G02B 25/008; G02B 25/02; G02B 25/04
USPC .................... 359/159.01, 480–482
See application file for complete search history.

(56) References Cited

U.S. PATENT DOCUMENTS

| | | | | |
|---|---|---|---|---|
| 3,273,456 A | * | 9/1966 | Feinbloom | G02B 7/002 351/158 |
| 2014/0109918 A1 | * | 4/2014 | Nabai | A41D 13/1184 128/858 |

FOREIGN PATENT DOCUMENTS

| | | |
|---|---|---|
| JP | 2003-204972 A | 7/2003 |
| JP | 2005-257802 A | 9/2005 |
| JP | 2014-044391 A | 3/2014 |
| WO | 2007/057987 A1 | 5/2007 |

OTHER PUBLICATIONS https://web.archive.org/web/20160525172356/http://optikam.com:80/products/optikampad/measurements/ May 25, 2016.*

* cited by examiner

*Primary Examiner* — Stephone B Allen
*Assistant Examiner* — Travis Fissel
(74) *Attorney, Agent, or Firm* — Manabu Kanesaka

(57) ABSTRACT

In assembling a binocular loupe device, a loupe of the binocular loupe device is attached to an appropriate position at a correct angle according to a pupil position of a user in a near vision state. A rectangular, transparent measurement assisting plate fixed to a frame before attachment of a loupe is worn by a user, and the face of the user in a near vision state is photographed by a camera from a work object point P to obtain a first image. The first image is subjected to arithmetic processing by a computer to measure, on the first image, coordinate positions of respective four vertexes of the measurement assisting plate and coordinate positions of respective left and right pupils of the user in the near vision state, and determines the loupe attachment position and/or loupe attachment angle on a plane of the plate member from the measured coordinate positions.

15 Claims, 21 Drawing Sheets

LOUPE MOUNTING POSITION DETERMINATION METHOD IN BINOCULAR LOUPE DEVICE, AND SYSTEM

BACKGROUND OF THE INVENTION

Field of the Invention

The present invention relates to assembly of a binocular loupe device.

Description of the Related Art

Binocular loupe devices have been widely used in, e.g., medical services (surgical operation, etc.) and precision machining in various other fields as a means for magnifying a surgical region or a work object part. In particular, binocular loupe devices for medical treatment concerned with human life are required to ensure high precision visibility during use.

Typically, as a binocular loupe device, an eyeglass type binocular loupe device in which left and right loupes (magnifiers) are attached to eyeglasses worn by a user (see, for example, Patent Document 1 and Patent Document 2) and a headband type binocular loupe device attached to a headband (belt) worn by a user at his or her head (see, for example, Patent Document 3) are known. Further, the eyeglass type binocular loupe device includes a lens fitting type in which loupes are directly fixed to the lenses of the eyeglasses (see, for example, Patent Document 1) and a front hanging type in which loupes are attached detachably or undetachably to the frame of eyeglasses by means of a clip or an arm so as to be positioned directly in front of the lenses of the eyeglasses (see, for example, Patent Document 2).

FIG. 1 illustrates a typical lens fitting type binocular loupe device. A binocular loupe device 1 of FIG. includes a frame 2 having the same structure as glasses for vision correction, left and right carrier lenses 4 fitted in left and right rims of the frame 2, left and right loupes 5, and an attachment part 6 for fixing the loupes 5 to their corresponding carrier lenses 4. The frame 2 has a temple 7 to be hung around the ears of a user for supporting the binocular loupe device 1, a bridge 8 connecting the left and right rims 3, and pads (not illustrated) coupled to the respective left and right rims 3 so as to sandwich the nose of a user.

As illustrated in FIG. 2A, a loupe attachment hole 10 for attachment of the loupe 5 is formed at a predetermined loupe attachment position on the carrier lens 4 so as to penetrate the carrier lens 4. The attachment part 6 includes an attachment adapter 11 having a short cylindrical shape and a loupe fixing ring 12 having a female screw in its inner periphery. As illustrated in FIG. 2B, the attachment adapter 11 is inserted into the loupe attachment hole 10 from the back side (user's face side) of the carrier lens 4 to be fitted and held. The loupe 5 is inserted into the through hole of the attachment adapter 11 with its rear end portion (eyepiece side) facing the front side of the carrier lens 4, and the loupe fixing ring 12 is screwed and fastened to the outer periphery of the rear end portion from the back surface of the carrier lens 4, whereby the loupe 5 is fixed to the carrier lens 4.

FIG. 3 illustrates a working posture of a user U who is a surgeon performing a surgical operation at hand, assuming substantially an upright standing posture. At this time, the user U looks at a surgical part P while keeping a posture in which a head 16' is inclined downward to the front at a certain angle α from the upright position 16' denoted by the dashed line in FIG. 3.

Generally, in human eyes, when the line of sight (axis of vision) directed to the front in a far vision state is shifted to a near vision state for reading or handwork, each eyeball is turned downward as illustrated in FIG. 4. Thus, the line of sight (axis of vision) is shifted from a direction 17 (horizontal direction in FIG. 4) in a far vision state to a direction 17' inclined downward at a certain angle r relative to the direction 17 in a near vision state. Such a downward inclination of the line of sight in a near vision state is also found in the working posture in which the head is inclined downward to the front as illustrated in FIG. 3. Therefore, the loupe 5 of FIG. 1 needs to be attached at the downward inclination angle r with respect to the front direction of the binocular loupe device 1 as illustrated in FIG. 4.

Further, in human eyes, when left and right lines of sight (axes of vision) directed to the front in parallel with each other in a far vision state are shifted to a near vision state for reading or handwork, eyeballs come close to each other or converged as illustrated in FIG. 5. Thus, the left and right lines of sight (axes of vision) are shifted from directions 18 and 18 (front direction in FIG. 5) in a far vision state to directions 18' and 18" inclined inward at certain angles p and q relative to the directions 18 and 18 in a near vision state. Therefore, the left and right loupes 5 of FIG. 1 need to be attached at the inward inclination angles p and q with respect to the front direction of the binocular loupe device 1 as illustrated in FIG. 5.

The present inventor has already developed a binocular loupe manufacturing method capable of determining the downward inclination angle and inward inclination angle for attachment of the loupe to the carrier lens (see, for example, Patent Document 4). In this method, a user is made to wear a frame before attachment of the loupe to the carrier lens, the face of the user in a working posture is photographed from the work object point, and obtained image data and distances measured from several work object points are used to determine the downward inclination angle and inward inclination angle of the loupe.

FIG. 6 is a conceptual view for schematically explaining a calculation method for the downward inclination angle r of the loupe. In FIG. 6, M denotes the linear distance between the work object point P and the carrier lens 4, N denotes the horizontal distance between the work object point P and the carrier lens 4, α is the forward inclination angle from the front view direction (horizontal direction in FIG. 4) of the carrier lens 4, and β denotes the angle between the horizontal straight line extending from the work object point P to the carrier lens side and a straight line extending from the work object point P to the carrier lens 4. As can be seen from FIG. 6, the downward inclination angle r is calculated as follows:

$$r = 90 - (90 - \beta) - \alpha = \beta - \alpha.$$

In Patent Document 4, the user in the working posture is photographed from a side, and the inclination angle of the head of the user or carrier lens 4 with respect to the vertical direction is measured from the obtained image data, whereby the angle α is obtained.

PRIOR ART DOCUMENT

Patent Document
[Patent Document 1] International Publication No. WO2007/057987A1
[Patent Document 2] Japanese Patent Application Publication No. 2005-257802
[Patent Document 3] Japanese Patent Application Publication No. 2003-204972
[Patent Document 4] Japanese Patent Application Publication No. 2014-044391

However, like general glasses lenses, the carrier lens 4 of the binocular loupe device 1 is inclined forward at a predetermined angle with respect to the front direction of the face in a fitted state so as to make the line of sight of the user and a lens optical axis coincide with each other. In addition, the forward inclination attachment angle may vary slightly for each user. Further, the hanging position of the temple 7 of the frame 2 may vary for each user, so that the carrier lens 4 is not always retained parallel (horizontal direction in FIG. 4) to the front direction of the face. Furthermore, it is not practically easy to measure the vertical direction and forward inclination angle α of the head with high precision from the photographed image of the camera. Thus, in the above-described conventional techniques, it is comparatively difficult to calculate the downward inclination angle r of the loupe with high precision from the measured value of the forward inclination angle α.

Further, the attachment position of each loupe 5 on the carrier lens 4 is preferably set such that the optical axis of the loupe 5 coincides with the line of sight of a user who looks at the work object point P in the working posture. However, a human's face is not symmetrical, so that in many cases, the frame 2 is somewhat inclined to the left or right even when the user faces forward and even when the height positions of the left and right pupils are the same. Further, the center position of the frame 2 in the left-right direction does not always coincide with the center position of the face, and thus the inward approaching amounts of the left and right eyes in a near vision state differ from each other.

The present invention has been made in view of above problems of the conventional techniques, and an object thereof is to provide a binocular loupe device assembling method capable of attaching a loupe with high precision in accordance with the line of sight of a user who looks at a work object point in a near vision state in a working posture in which his or her head is inclined forward.

More specifically, the object is to provide a binocular loupe device assembling method capable of measuring the forward inclination angle of the head of the user in the working posture with higher precision and thus of locating the loupe at a more correct downward inclination angle.

Another object of the present invention is to provide a method capable of determining the attachment position of the loupe with higher precision and comparatively easily in the assembly of the binocular loupe device and a system therefor.

SUMMARY OF THE INVENTION

Still another object of the present invention is to provide a loupe attachment assisting tool suitable for determining the attachment position of the loupe with higher precision and with ease in the assembly of the binocular loupe device.

According to a first aspect of the present invention, there is provided a loupe attachment assisting tool for use in attaching a pair of left and right loupes corresponding to the left and right eyes of a user at predetermined positions of a holder worn on the head or face of the user, the loupe attachment assisting tool including a transparent and flat plate member having a substantially rectangular shape, wherein the plate member has an attachment part for removably fixing the plate member to the holder, and the plate member has such a size that the pupils of the left and right eyes are positioned within a plane of the plate member when the head of the user in a near vision state is viewed from a work object point on near lines-of-sight of the left and right eyes of the user in a state where the holder to which the plate member is fixed by the attachment part is worn on the head or face of the user.

With the above configuration, pupil positions of the left and right eyes of the user on the plane of the plate member can be identified, making it possible to easily determine the loupe attachment position in accordance with the pupil positions of the user.

In one embodiment, the attachment part is configured to fix the plate member to the holder such that the plane of the plate member is orthogonal to a far line of sight of the user who wears the holder.

In another embodiment, the plate member has a substantially rectangular frame line formed along the peripheral edge thereof.

In one embodiment, the frame has a higher reflectance than the surroundings.

In another embodiment, the frame has a white or light color.

According to a second aspect of the present invention, there is provided a method for determining an attachment position of a pair of left and right loupes to be attached to a holder worn on the head or face of a user so as to correspond to the left and right eyes of the user, the method including: a step of preparing the holder fitted with the above-described loupe attachment assisting tool of the present invention; a step of acquiring a first image including the whole plate member as the loupe attachment assisting tool and including left and right pupils of the user in a near vision state within a plane of the plate member by photographing the face of the user in a near vision state who wears the holder at his or her head or face from a work object point on near lines of sight of the left and right eyes; a step of measuring, on the first image, coordinate positions of respective vertexes of the plate member and coordinate positions of the respective left and right pupils in the near vision state; and a step of determining an attachment position and/or attachment angle of the loupe on the plane of the plate member by calculating coordinates of points at which lines of sights of the user directed toward the work object point pass through the plate member based on the measured coordinate positions of respective vertexes of the plate member and the coordinate positions of the respective left and right pupils.

By thus applying arithmetic processing to the first image, the pupil positions of the left and right eyes of the user in a near vision state on the plane of the plate member as the loupe attachment assisting tool can be identified, making it possible to easily determine the loupe attachment position and/or loupe attachment angle in accordance with the pupil positions of the user.

In one embodiment, in the step of determining the loupe attachment position, coordinate positions of respective vertexes of a virtual plate member before being projected on a plane of the first image, which is obtained by rotating the plate member on the first image about a straight line passing through the centers of the left and right pupils such that the plane of the plate member faces directly forward are calculated based on the measured coordinate positions of the respective vertexes of the plate member, and based on the calculated coordinate positions of the respective vertexes of the virtual plate member, the loupe attachment position on the plane of the plate member is determined.

In another embodiment, the loupe attachment position determination method further includes a step of acquiring a second image including the whole plate member and including the left and right pupils of the user in a far vision state within the plane of the plate member by photographing the face of the user in a far vision state who wears the holder at his or her head or face from the front; and a step of measuring, on the second image, coordinate positions of respective vertexes of the plate member and coordinate positions of the respective left and right pupils in the far vision state.

In one embodiment, in the step of determining the loupe attachment position, a conversion matrix for converting three-dimensional coordinate positions of the respective vertexes of the plate member before being projected on the plane of the first image into the coordinate positions of the respective vertexes of the plate member on the plane of the first image is calculated based on the measured coordinate positions of the respective vertexes of the plate member and an actual dimension of the plate member, and an inverse conversion matrix of the conversion matrix is used to calculate the three-dimensional coordinate positions from the coordinate positions of the respective vertexes on the plane of the plate member.

In another embodiment, in the step of determining the loupe attachment angle, a downward inclination angle and/or inward inclination angle of the near line of sight with respect to a far line of sight of the user are determined.

In one embodiment, the direct distance between the work object point and the plane of the plate member and horizontal distance therebetween are measured, and the downward inclination angle is determined based on the direct distance, horizontal distance, and a forward inclination angle of the head of the user.

In another embodiment, based on the coordinate positions of the respective vertexes of the plate member on the first image and three-dimensional coordinate positions of the respective vertexes of the plate member before being projected on the plane of the first image, the rotation angle between a plane including the plate member on the first image and a plane including the plate member before being projected on the plane of the first image is calculated to determine the downward inclination angle.

In another embodiment, the direct distance between the work object point and the plane of the plate member and the inward approaching amounts of the left and right pupils of the user on the plane of the plate member are measured, and the inward inclination angles of the respective left and right eyes are determined based on the measured direct distance and inward approaching amounts.

In one embodiment, the holder includes a frame worn on the face of the user and a carrier lens fitted to the frame, and the loupe is attached to the carrier lens.

In another embodiment, the holder includes a frame worn on the face of the user and a support part extending to the front from the frame, and the loupe is supported by the support part.

In still another embodiment, the holder includes a headband worn on the head of the user and a support part extending to the front from the frame, and the loupe is supported by the support part.

According to a third aspect of the present invention, there is provided a system for determining an attachment position of a pair of left and right loupes to be attached to a holder worn on the head or face of a user so as to correspond to the left and right eyes of the user, the system including: a camera; and an arithmetic processing device for processing a image photographed by the camera, wherein the arithmetic processing device applies arithmetic processing to a first image including the whole plate member as the loupe attachment assisting tool and including left and right pupils of the user in a near vision state within a plane of the plate member, which is acquired by photographing, using the camera, the face of the user in a near vision state who wears the holder fitted with the above-described loupe attachment assisting tool of the present invention at his or her head or face from a work object point on near lines of sight of the left and right eyes to measure, on the first image, coordinate positions of respective vertexes of the plate member and coordinate positions of the respective left and right pupils in the near vision state and calculates coordinates of points at which near lines of sights of the user directed toward the work object point pass through the plate member based on the measured coordinate positions of respective vertexes of the plate member and coordinate positions of the respective left and right pupils to determine an attachment position and/or attachment angle of the loupe on the plane of the plate member.

With the above configuration, the pupil positions of the left and right eyes of the user in a near vision state on the plane of the plate member as the loupe attachment assisting tool can be identified, making it possible to easily determine the loupe attachment position and/or loupe attachment angle in accordance with the pupil positions of the user.

In one embodiment, the arithmetic processing device calculates coordinate positions of respective vertexes of a virtual plate member before being projected on a plane of the first image, which is obtained by rotating the plate member on the first image about a straight line passing through the centers of the left and right pupils such that the plane of the plate member faces directly forward based on the measured coordinate positions of the respective vertexes of the plate member and determines the loupe attachment position on the plane of the plate member based on the calculated coordinate positions of the respective vertexes of the virtual plate member.

In another embodiment, the arithmetic processing device processes a second image including the whole plate member and including the left and right pupils of the user in a far vision state within the plane of the plate member, which is acquired by photographing, by the camera, the face of the user in a far vision state who wears the holder at his or her head or face from the front and measures, on the second image, coordinate positions of respective vertexes of the plate member and coordinate positions of the respective left and right pupils in the near vision state.

In still another embodiment, the arithmetic processing device calculates a conversion matrix for converting three-dimensional coordinate positions of the respective vertexes of the plate member before being projected on the plane of the first image into the coordinate positions of the respective vertexes of the plate member on the plane of the first image based on the measured coordinate positions of the respective vertexes of the plate member and an actual dimension of the plate member and uses an inverse conversion matrix of the conversion matrix to calculate the three-dimensional coordinate positions from the coordinate positions of the respective vertexes on the plane of the plate member.

In one embodiment, the arithmetic processing device determines a downward inclination angle and/or inward inclination angle of the near line of sight with respect to a far line of sight of the user.

In another embodiment, the arithmetic processing device determines the downward inclination angle based on the direct distance between the work object point and the plane of the plate member, horizontal distance therebetween, and a forward inclination angle of the head of the user.

In another embodiment, the arithmetic processing device calculates the rotation angle between a plane including the plate member on the first image and a plane including the plate member before being projected on the plane of the first image based on the coordinate positions of the respective vertexes of the plate member on the first image and three-dimensional coordinate positions of the respective vertexes of the plate member before being projected on the plane of the first image to determine the downward inclination angle.

In another embodiment, the arithmetic processing device determines the inward inclination angles of the respective left and right eyes based on the direct distance between the work object point and the plane of the plate member and the inward approaching amounts of the left and right pupils of the user on the plane of the plate member.

According to a fourth aspect of the present invention, there is provided an assembling method for a binocular loupe device provided with a pair of left and right loupes to be attached to a holder worn on the head or face of a user so as to correspond to the left and right eyes of the user, the assembling method including: a step of determining an attachment position and/or attachment angle of the loupe with respect to the holder according to the above-described loupe attachment position determination method of the present invention; and a step of attaching the loupe to the holder according to the determined attachment position and/or attachment angle.

With the above configuration, the binocular loupe device can be assembled so as to be attached to the holder according to a proper attachment position and/or attachment angle.

In one embodiment, the holder includes a frame worn on the face of the user and a carrier lens fitted to the frame, and the loupe is attached to the carrier lens.

In another embodiment, the holder includes a frame worn on the face of the user and a support part extending to the front from the frame, and the loupe is attached to the support part so as to be supported thereby.

In still another embodiment, the holder includes a headband worn on the head of the user and a support part extending to the front from the frame, and the loupe is attached to the support part so as to be supported thereby.

DESCRIPTION OF THE PREFERRED EMBODIMENTS

Figure 1:
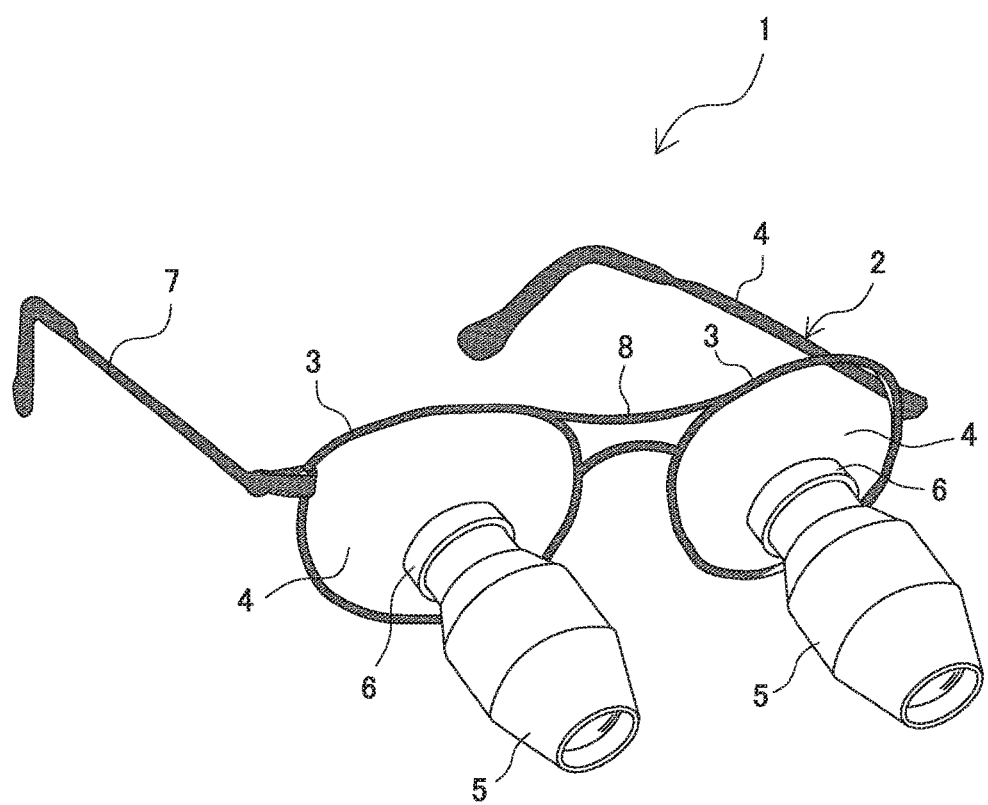
FIG. 1 is an entire configuration view of a typical lens fitting type binocular loupe device.

Hereinafter, a preferred embodiment of the present invention will be described in detail with reference to the accompanying drawings. Throughout the accompanying drawings, the same or similar reference numerals are used to designate the same or similar components.

Figure 7:
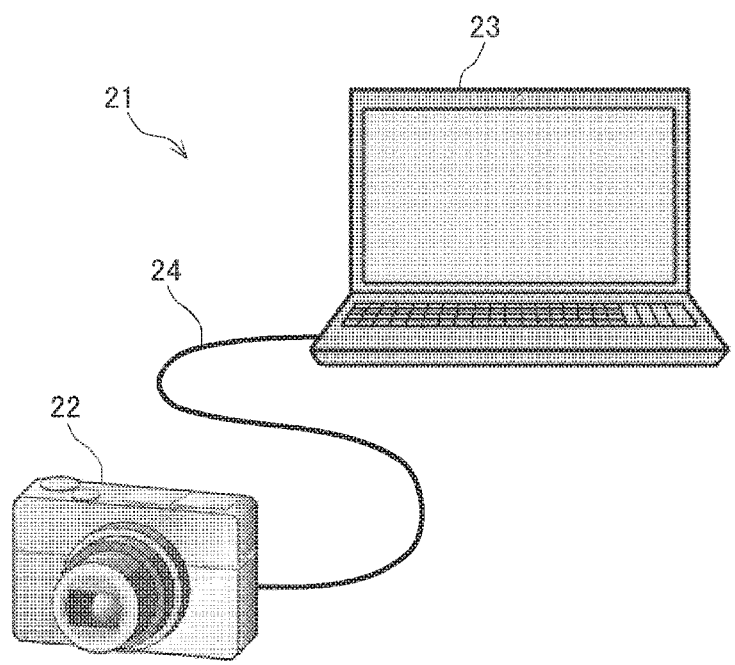
FIG. 7 is an entire configuration view of a loupe attachment position determination system according to the present invention.

FIG. 7 schematically illustrates the entire configuration of a system for determining the attachment positions of left and right loupes in assembly of a binocular loupe device according to the present invention. In FIG. 7, a loupe attachment position determination system 21 includes a camera 22 (digital camera), a computer 23 for processing images captured by the camera 22, and a communication cable 24 connecting the camera 22 and computer 23. The loupe attachment position determination system 21 is used not only for determining the loupe attachment position but also for detecting the coordinate positions of respective left and right pupils and then calculating the loupe downward inclination angle and loupe inward inclination angle.

The camera 22 is used for photographing a frame 25 and the face of a user U wearing the frame 25 before attachment of the left and right loupes from the front side. A measurement assisting plate 26 is fixed to the front surface of the frame 25 as a loupe attachment position determination assisting tool suitable for determining the loupe attachment position. In the present embodiment, a surgeon who performs a surgical operation at a work object point P can be assumed as the user U.

Figure 8:
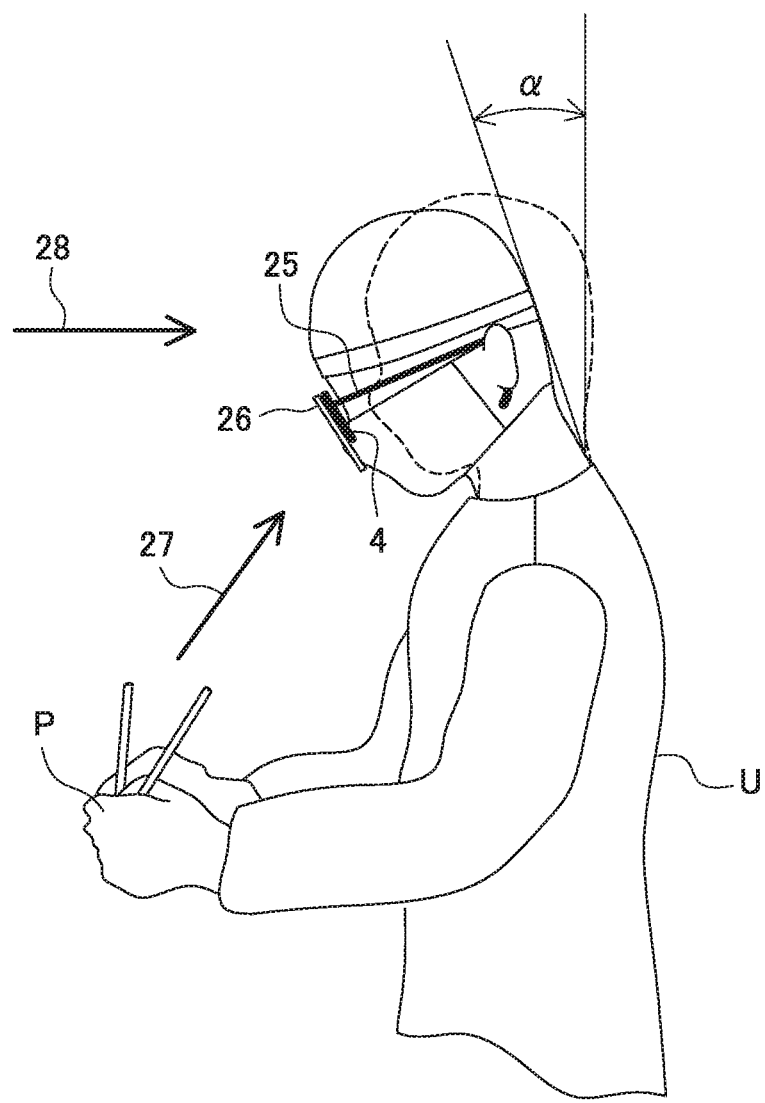
FIG. 8 is an explanatory view illustrating camera photographing directions.

Photographing using the camera 22 is performed with the optical axis of the camera 22 directed obliquely upward toward the face of the user U in a working posture in which his or her head is inclined forward at an angle α from the work object point P as denoted by the arrow 27 of FIG. 8 and with the optical axis of the camera 22 directed straight and horizontally toward the face of the user U facing forward horizontally (denoted by the dashed line in FIG. 8) from the front side as denoted by the arrow 28 of FIG. 8. The photographed image data is sent from the camera 22 to the computer 23 over the communication cable 24 for image processing to be described later.

Figure 9:
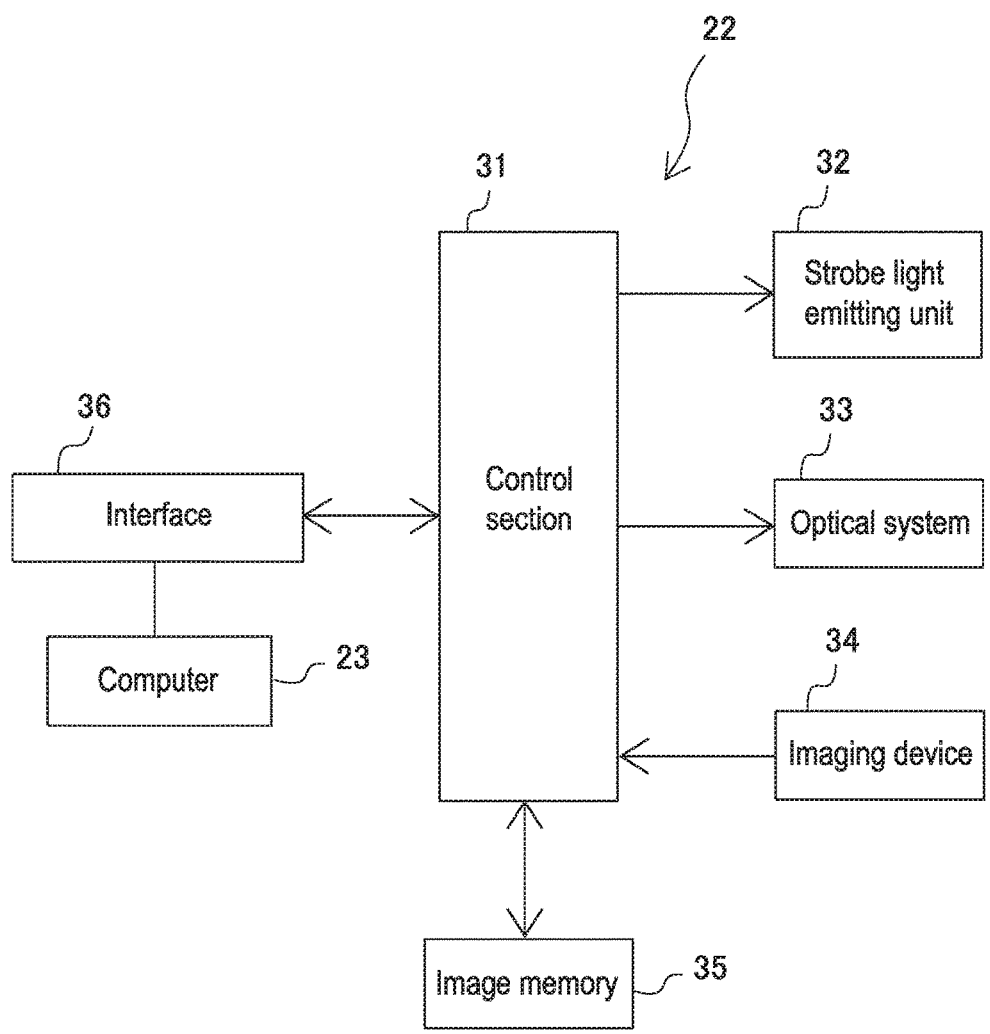
FIG. 9 is a block diagram illustrating the configuration of the camera of FIG. 7.

FIG. 9 schematically illustrates the configuration of the camera 22. The camera 22 includes a control section 31, a strobe light emitting unit 32, an optical system 33, an imaging device 34, an image memory 35, and an interface 36 for exchanging data and signals with the computer 23. The control section 31 includes a program storage section that stores a program for controlling individual sections of the camera 22 and a CPU for executing the program. The control section 31 performs imaging magnification or focusing of the optical system 33 according to an instruction from the computer 23, storage/readout of image data in/from the image memory 35, and the like.

Figure 10:
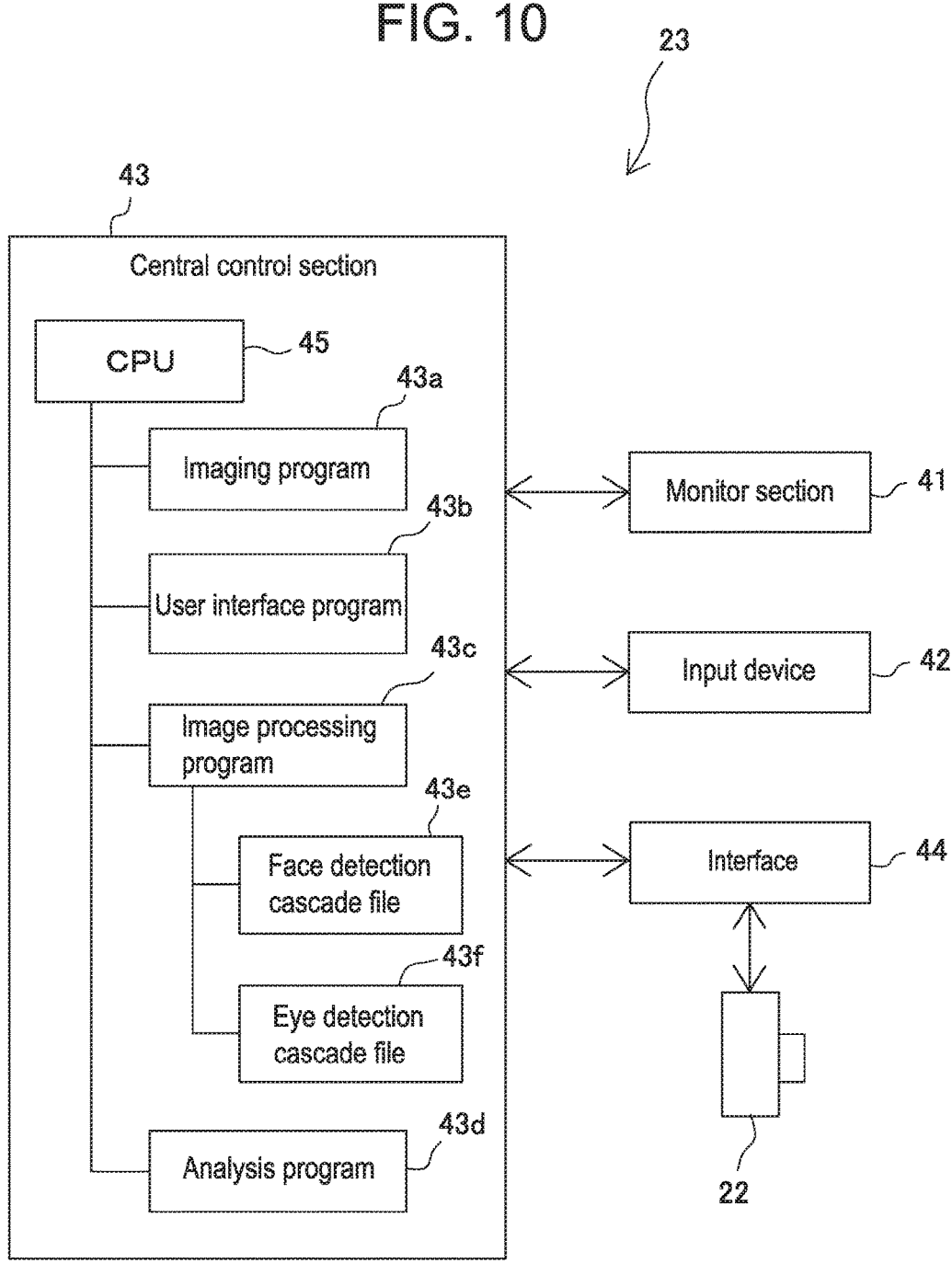
FIG. 10 is a block diagram illustrating the configuration of the computer of FIG. 7.

FIG. 10 schematically illustrates the configuration of the computer 23. The computer 23 includes a monitor section 41, an input device 42, a central control section 43 that performs predetermined arithmetic processing or control processing based on a program, and an interface 44 for exchanging data and signals with the camera 22. The central control section 43 includes an imaging program 43a, a user interface program 43b, an image processing program 43c, and an analysis program 43d, and a central processing unit (CPU) 45 that executes these programs.

In the present embodiment, the image processing program 43c is a cascade classifier that classifies an object to be identified by subdividing the same from superordinate categories to subordinate categories and identifies the face or eyes from an image of the user photographed by the camera 22. Thus, image processing program 43c includes a face detection cascade file 43e and an eye detection cascade file 43f that store therein features of faces and eyes, respectively, through learning.

Figure 11:
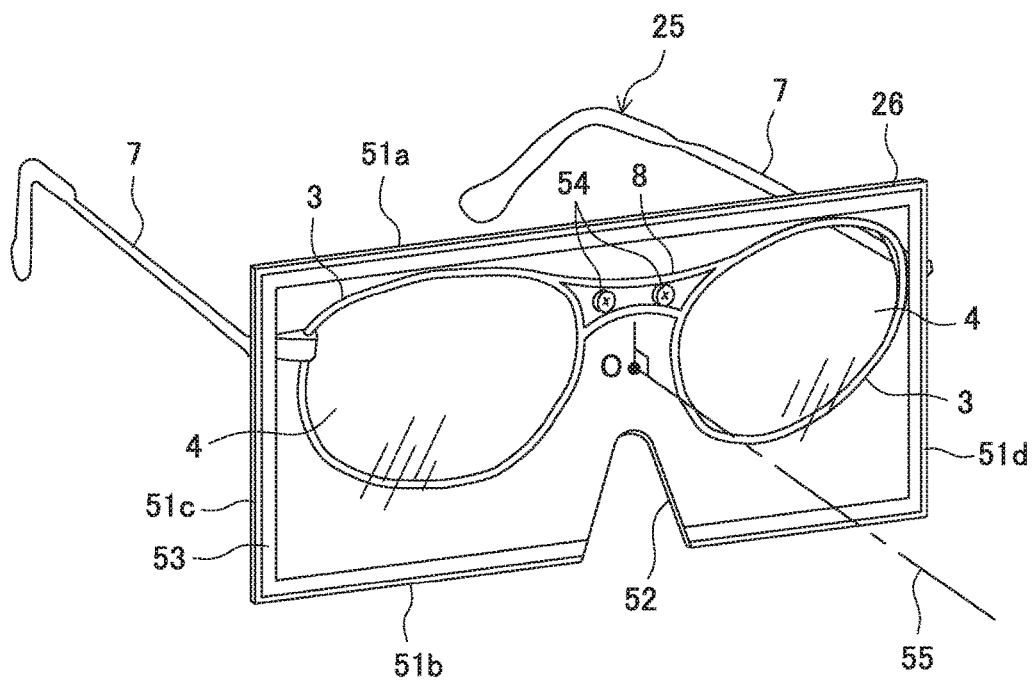
FIG. 11 is a perspective view illustrating a measurement assisting plate fixed to the frame.

As illustrated in FIG. 11, the measurement assisting plate 26 is made of a laterally elongated flat transparent plate member. A substantially triangular cut 52 is formed at the center of a lower side 51b of the measurement assisting plate 26 so as to prevent the nose of the user who wears the frame 25 from contacting the measurement assisting plate 26.

A rectangular frame line 53 having a constant width is formed over the entire periphery of the measurement assisting plate 26 excluding the cut 52. The frame line 53 is preferably formed of a paint having high reflectance for strobe light emitted at photographing or a light-colored (white, etc.) material so as to be clearly distinguishable from the surroundings.

The measurement assisting plate 26 is removably fixed to the front surface of a bridge 8 of the frame 25 using an adequate attachment means such as a screw 54. The measurement assisting plate 26 is disposed such that upper and lower sides 51a and 51b thereof are in parallel with the horizontal direction of the frame 25, that the center position thereof in the left-right direction coincides with that of the frame 25, and that the plane thereof is orthogonal to a front view direction 55 of the frame 25. In another embodiment, the measurement assisting plate 26 can be removably fixed to the bridge 8 of the frame 25 using another attachment means such as a clip.

The vertical dimension of the measurement assisting plate 26 and the attachment position thereof to the frame are preferably set such that the upper side 51a is located above the upper end of a rim 3 of the frame 25 when the frame 25 is viewed from the front and that the lower side 51b is positioned below the lower end of the rim 3 when the near line-of-sight direction is viewed in the opposite direction from an obliquely downward side, that is, when the user in the working posture is viewed obliquely upward from the work object point P. The horizontal dimension of the measurement assisting plate 26 is preferably set such that left and right sides 51c and 51d are positioned near the left and right outer ends of the rim 3 and at least outside of the left and right pupils of the user when the frame 25 is viewed from the front and near line-of-sight direction is viewed in the opposite direction.

With the above configuration, even when the frame 25 that the user wears is photographed from any of the directions of the arrows 27 and 28 shown in FIG. 8, it is possible to obtain an image in which both the upper and lower ends of the rim 3 of the frame 25 and both pupils of user are positioned inside the rectangular frame line 53 of the measurement assisting plate 26. Thus, as described above, by applying arithmetic processing to the image data of the camera 22, the positions of the left and right pupils of the user on the carrier lens 4 of the frame 25 can reliably be calculated from the relative positional relationship with the frame line 53 on the photographed image.

Figure 4:
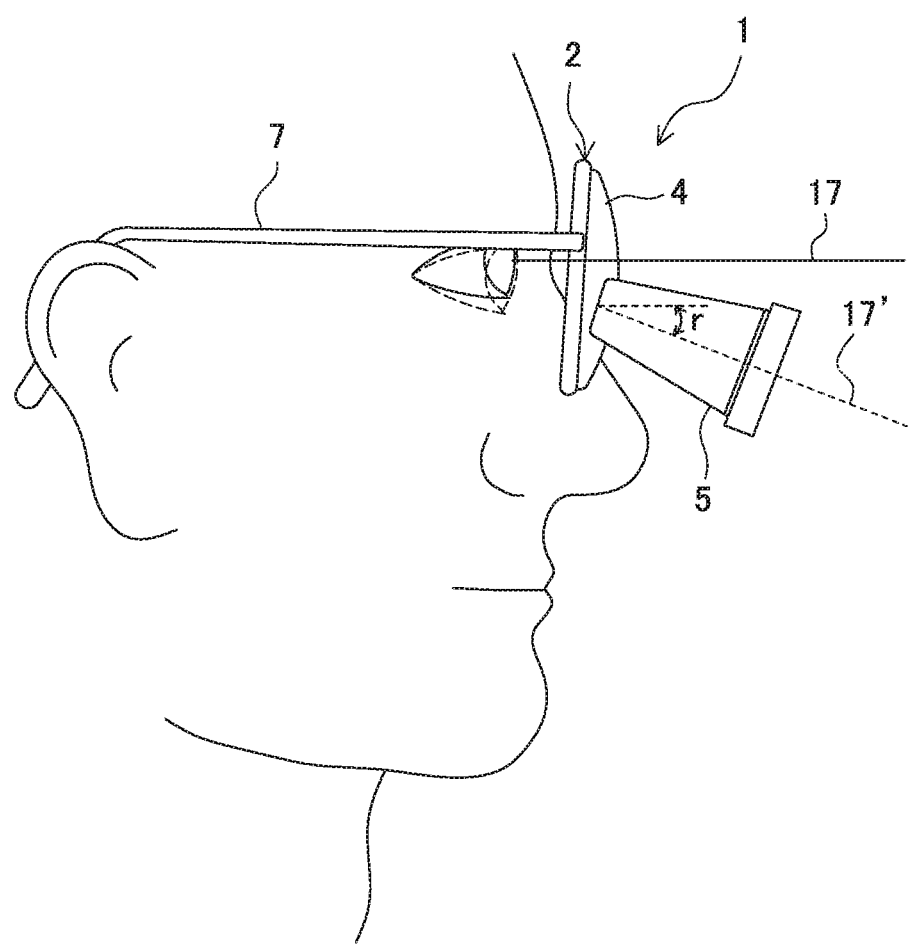
FIG. 4 is an enlarged right-side view of the face of a user wearing the binocular loupe device.
Figure 5:
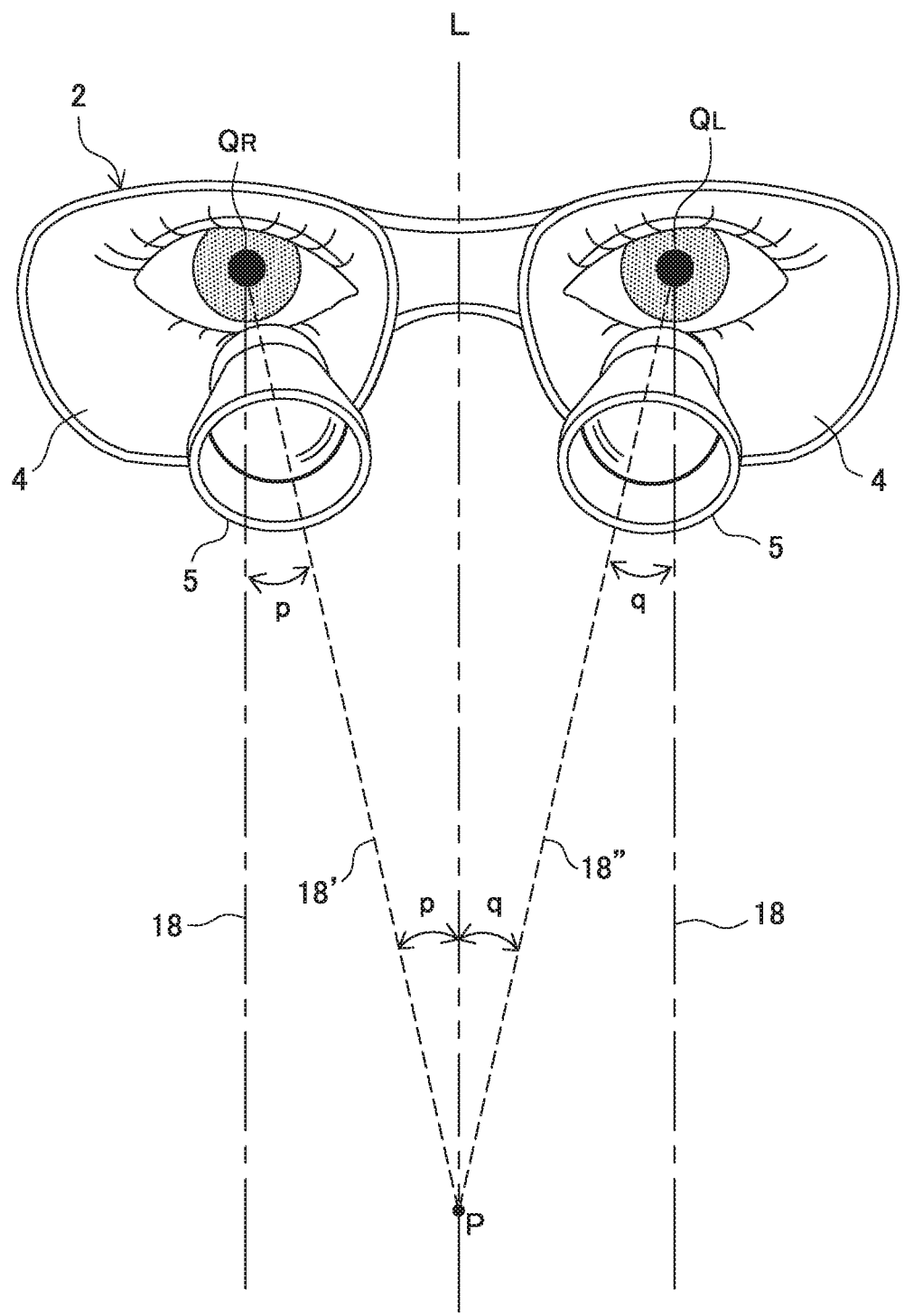
FIG. 5 is an explanatory view illustrating the inward inclination angles of respective left and right loupes attached to carrier lenses.

As illustrated in FIG. 4, the carrier lens 4 has a lens surface curved in a convex manner toward the front side and is, as described above, fitted to the frame 25 inclined forward with respect to the front view direction. Therefore, a gap is generated between the curved lens surface of the carrier lens 4 and the back surface of the flat measurement assisting plate 26, and the size of the gap, i.e., distance between the curved lens surface of the carrier lens 4 and the back surface of the flat measurement assisting plate 26 varies depending on the plane position on the measurement assisting plate 26. In addition, the distance may vary depending on the type or structure of the frame 25 itself or the forward inclination angle of the carrier lens 4. Thus, it is preferable to measure, in advance, the distance with respect to the plane position on the measurement assisting plate 26 for each type and structure of the frame to be used and each forward inclination angle of the carrier lens 4 and turn the measurement results into data.

Figure 12:
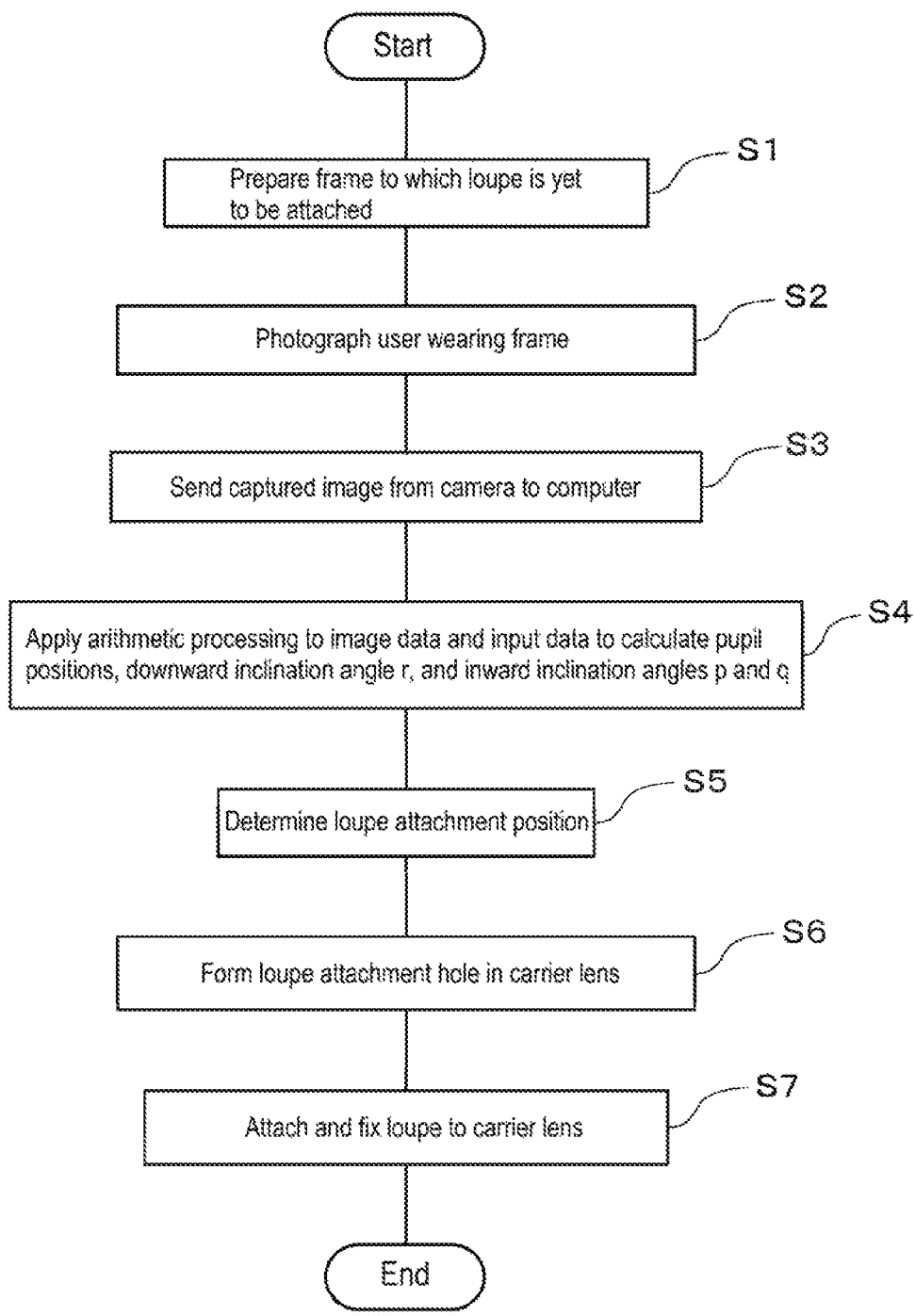
FIG. 12 is a flowchart illustrating a binocular loupe device assembling method.

The flowchart of FIG. 12 illustrates a binocular loupe device assembling method of the present invention in process order.

First, the frame 25 with measurement assisting plate 26 to which a loupe is yet to be attached is prepared (step S1). Then, the user is made to wear the frame 25, and the face and frame 25 are photographed by the camera 22 (step S2). Image data obtained through photographing is sent from the camera 22 to the computer 23 over the communication cable 24 and then processed (step S3). The computer 23 calculates the positions of the respective left and right pupils on the image and downward inclination angle r and inward inclination angles p and q for attachment of the loupe from the image data output from the camera 22 and input data input through the input device 42 (step S4).

Further, the computer 23 determines the loupe attachment position on the carrier lens 4 based on the image data and input data (step S5). Then, based on the determined loupe attachment position, downward inclination angle r, and inward inclination angles p and q, a loupe attachment hole is formed in the carrier lens 4 of the frame 25 after removal of the measurement assisting plate (or a frame 25 having the same structure as the foregoing one but not attached with the measurement assisting plate 26) (step S6). Finally, the left and right loupes are inserted to the respective loupe attachment holes and fixed thereto, whereby the binocular loupe device is completed (step S7).

Hereinafter, the respective steps of the assembling method will be described more in detail. In step S1, the measurement assisting plate 26 is attached to the frame of the type and size that the user uses in the binocular loupe device in actual use in the manner as described above using FIG. 11 for preparation of the frame 25. The user wears the prepared frame 25 in the same way as that he or she will do in actual scenes.

In Step S2, a first photographing and a second photographing are performed. In the first photographing, as denoted by the arrow 27 of FIG. 8, the face of the user U in the working posture in which his or her head is inclined forward at the angle α is photographed by the camera 22 set up at the work object point P. In the second photographing, as denoted by the arrow 28 of FIG. 8, the face of the user U in an upright posture in which his or her head is held straight is photographed from the front side. As described later, the first image obtained by the first photographing is used exclusively for calculating the downward inclination angle r, inward inclination angles p and q, and loupe attachment position, and the second image obtained by the second photographing is used exclusively for calculating the loupe attachment position in combination with the first image.

The photographing is performed by the computer 23 controlling the operation of the camera 22. In the computer 23, the central control section 43 executes the imaging program 43a to control the optical system 33 of the camera to thereby focus on a center point O (FIG. 11) of the measurement assisting plate 26 fixed to the frame 25. In the camera 22, the control section 31 receives an instruction from the computer 23, then converts an image captured by the optical system 33 into an electrical signal by the imaging device 34, and outputs the obtained electrical signal to the computer 23 through the interface 36.

The computer 23 displays the image received from the camera 22 on the monitor section 41. From the displayed image on the monitor section 41, the operator of the loupe attachment position determination system 21 can input an instruction necessary for adjustment of a capturing range and position of the image captured by the camera 22 and adjustment of a focal length through the input device 42. The computer 23 controls the camera 22 according to the instruction to adjust the image displayed on the monitor section 41.

After the image on the monitor section 41 is satisfactorily adjusted, the operator of the computer 23 instructs the camera 22 to perform photographing, i.e., release the shutter. The camera 22 receives the photographing instruction from the operator by way of the computer 23 and, in quick response to this, activates the strobe light emitting unit 32 and emits strobe light for photographing. The photographed image is converted into an electrical signal by the imaging device 34 of the camera 22 and output, and image data corresponding to the electrical signal is stored in the image memory 35 by the control section 31.

Figure 13:
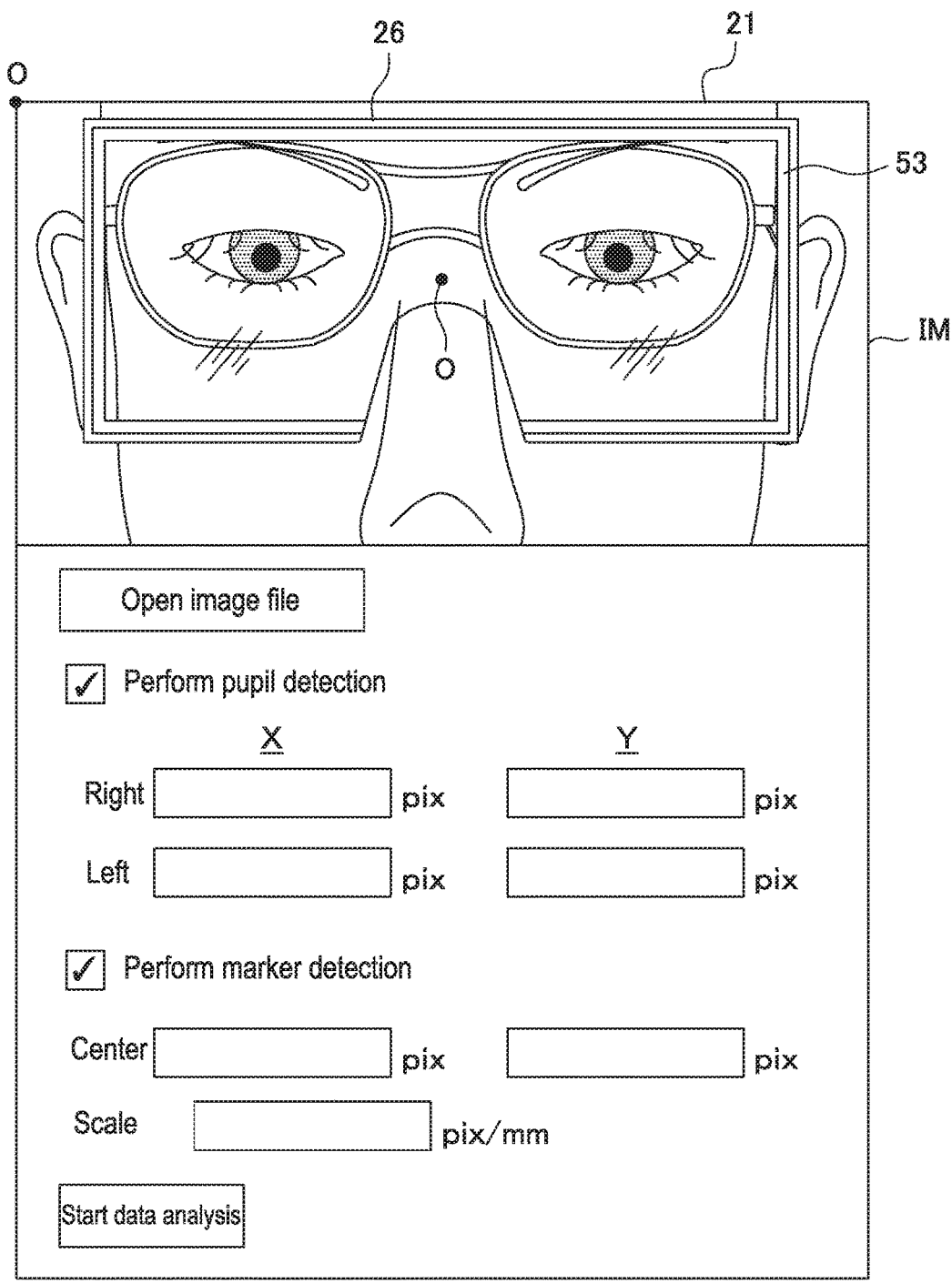
FIG. 13 illustrates an example of a user interface window displayed on a monitor section.

In step S3, when the operator inputs an instruction to perform image processing, the central control section 43 of the computer 23 executes the user interface program 43b to display a user interface window on the monitor section 41. FIG. 13 illustrates an example of the user interface window. The user interface window has an image display area IM on the upper portion thereof provided for displaying a photographed image and has a plurality of operation instruction buttons and a plurality of numerical value display fields on the lower portion thereof.

When the operator clicks an "OPEN IMAGE FILE" button on the user interface window, the image data stored in the image memory 35 of the camera 22 are displayed in a list at a predetermined display position (not illustrated) on the monitor section 41. The operator selects specific image data from the list, and the selected image data is read out from the image memory 35 by the central control section 43 and displayed in the image display area IM as illustrated in FIG. 13.

Then, in step S4, the operator can select predetermined processing on the user interface screen. For example, when the operator checks a "PERFORM PUPIL DETECTION" button and clicks an "ANALYSIS START" button, the central control section 43 of the computer 23 executes the image processing program 43c and then analyzes the image displayed in the image display area IM to detect the positions of the pupils on the image. When the operator checks a "PERFORM MARKER DETECTION" button and clicks the "ANALYSIS START" button, the central control section 43 of the computer 23 executes the image processing program 43c and then analyzes the image displayed in the image display area IM to detect the position of the center point O of the measurement assisting plate 26.

Figure 14B:
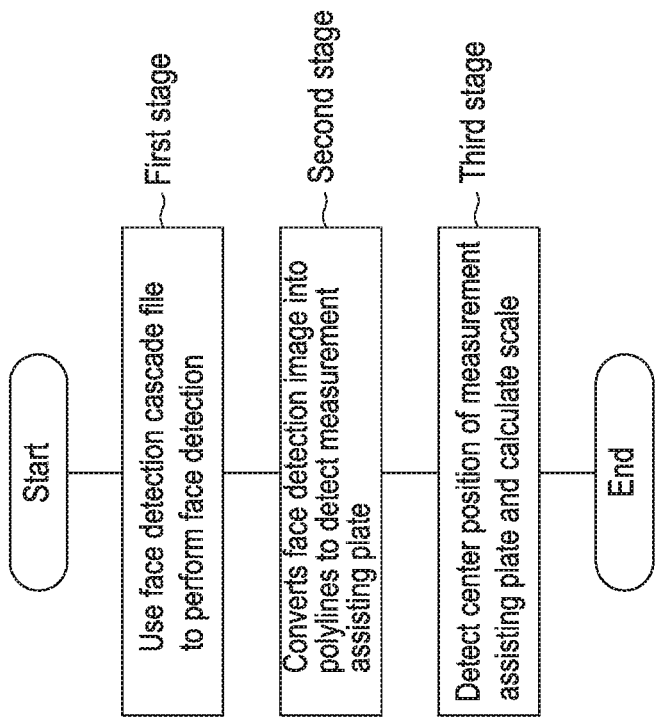
FIGS. 14A and 14B are explanatory views illustrating the processing procedures using a cascade type classification program.
Figure 14A:
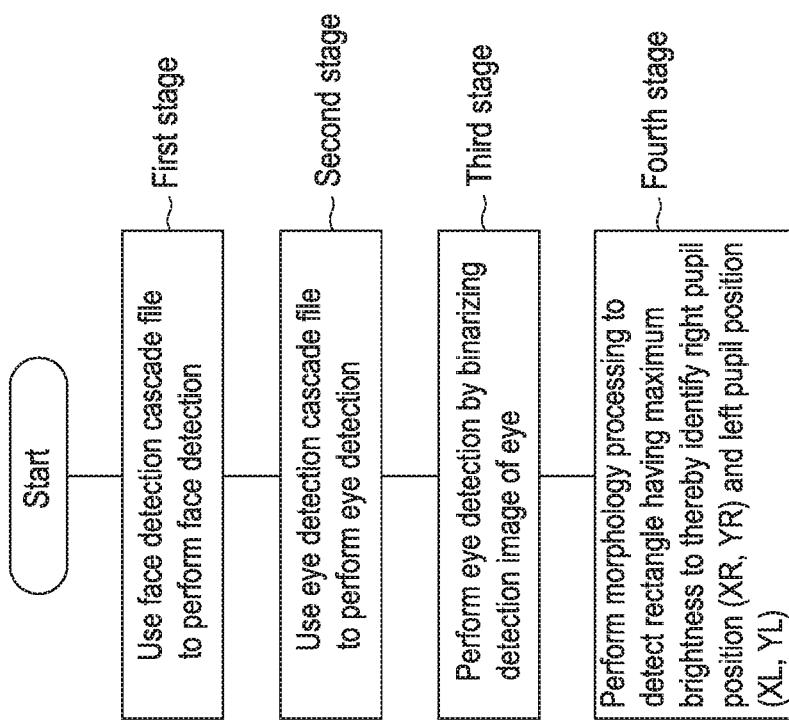

FIG. 14A illustrates the processing procedure of pupil position detection using the image processing program 43c. The image processing program 43c processes the image data selected in step S3 and identifies a position where brightness changes sharply, in other words, discontinuously from the photographed image to thereby detect the pupil positions. This processing is carried out according to four steps, i.e., first to fourth stages illustrated in FIG. 14A.

In the first stage, the central control section 43 uses the face detection cascade file 43e to perform face detection by determining whether a target to be identified on the image in the image display area IM corresponds to the face of the user according to image features peculiar to a face. In the second stage, the central control section 43 subdivides the target to be identified and uses the eye detection cascade file 43f to perform eye detection by determining whether a target to be identified on the image corresponds to the eye of the user according to image features peculiar to an eye.

In a third stage, the central control section 43 detects the contour of an iris by binarizing a detection image of the eye. In a fourth stage, the central control section 43 performs morphology processing to detect a rectangle having the maximum brightness and, thereby, the computer 23 detects the coordinate position (XR, YR) of the center of the right pupil of the user and coordinate position (XL, YL) of the center of the left pupil and displays them on the user interface window. In this case, for example, a point at the upper left corner of the image display area IM is set as a coordinate origin O.

FIG. 14B illustrates the processing procedure of detecting the measurement assisting plate 26 using the image processing program 43c. The image processing program 43c processes the image data selected in step S3 and detects the measurement assisting plate 26 according to the three steps, i.e., first to third stages illustrated in FIG. 14B.

In the first stage, the central control section 43 uses the face detection cascade file 43e to perform face detection to thereby narrow down the area where the measurement assisting plate 26 may exist. In the second stage, the central control section 43 converts the face detection image into polylines and extracts, from objects each having four corners, an object in which the angle of each of the four corners is near 90° to thereby recognize the measurement assisting plate 26.

Then, in the third stage, the computer 23 displays the coordinate position of the center point O of the thus recognized measurement assisting plate 26 and a scale in the image display area IM. In the present embodiment, the scale indicates correspondence between 1 mm and the number of pixels in the image, and the central control section 43 calculates the scale based on the actual size of the measurement assisting plate 26 previously input in the computer 23.

Then, the computer 23 executes the analysis program 43d. The analysis program 43d uses the center positions of the left and right pupils and the position of the center point of the measurement assisting plate 26 detected in the processing of FIGS. 14A and 14B, respectively, to calculate the downward inclination angle r and inward inclination angles p and q of the loupe as will be described below.

Figure 6:
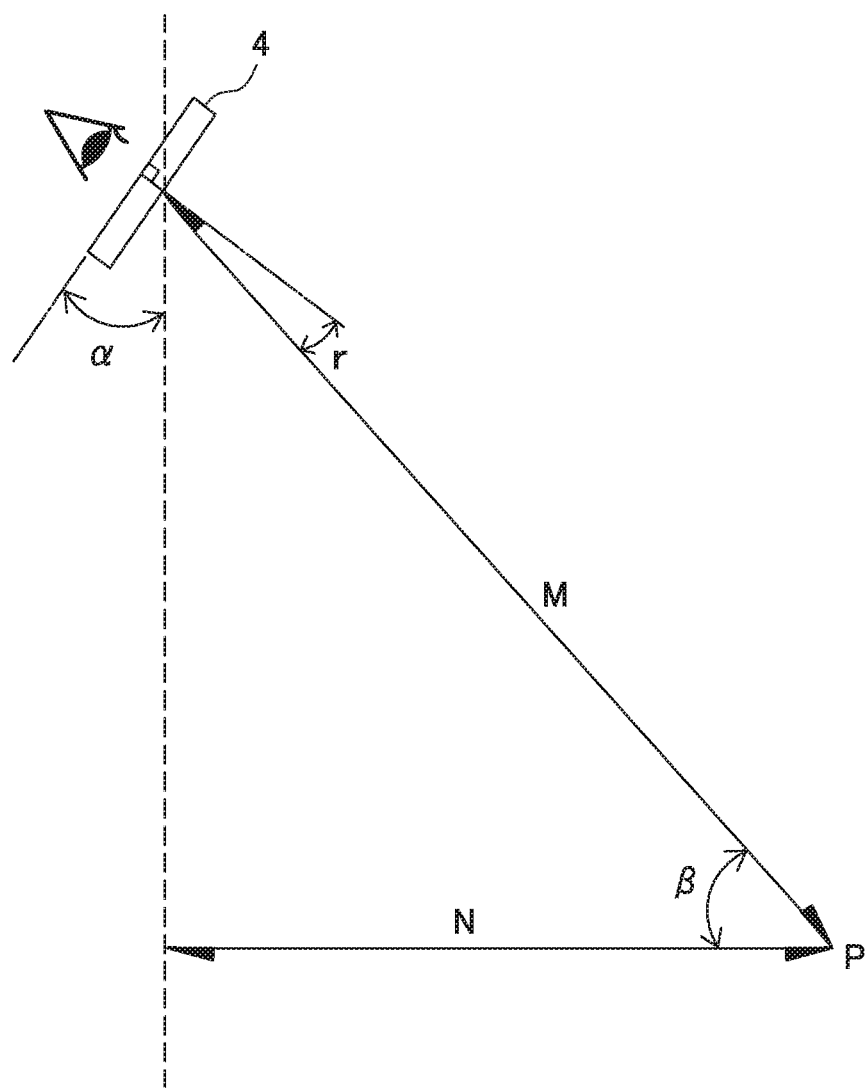
FIG. 6 is an explanatory view illustrating the downward inclination angle of the loupe attached to the carrier lens.

As described using FIG. 6, the downward inclination angle r can be calculated from the forward tilting angle α of the head of the user assuming the working posture and the angle (elevation angle) β at which the carrier lens 4 is viewed from the work object point P. As described above, the angle β can be calculated from a direct distance M between the work object point P and the carrier lens 4 and a horizontal distance N therebetween.

As described above, the distances M and N can be measured using, e.g., a measuring means. The distance M can also be measured by a laser measurement device, using a laser beam irradiated onto the center point O of the measurement assisting plate 26 from the work object point P. Further, in addition to the above actual measurement, the distance M can be calculated according to the following expression from a focal length f of the optical system of the camera 22, the actual lateral dimension of the measurement assisting plate 26, and an image size on the imaging surface (i.e., imaging device) of the camera 22: M={f×(actual size of measurement assisting plate 26)}/(image size on the imaging surface)

Figure 15:
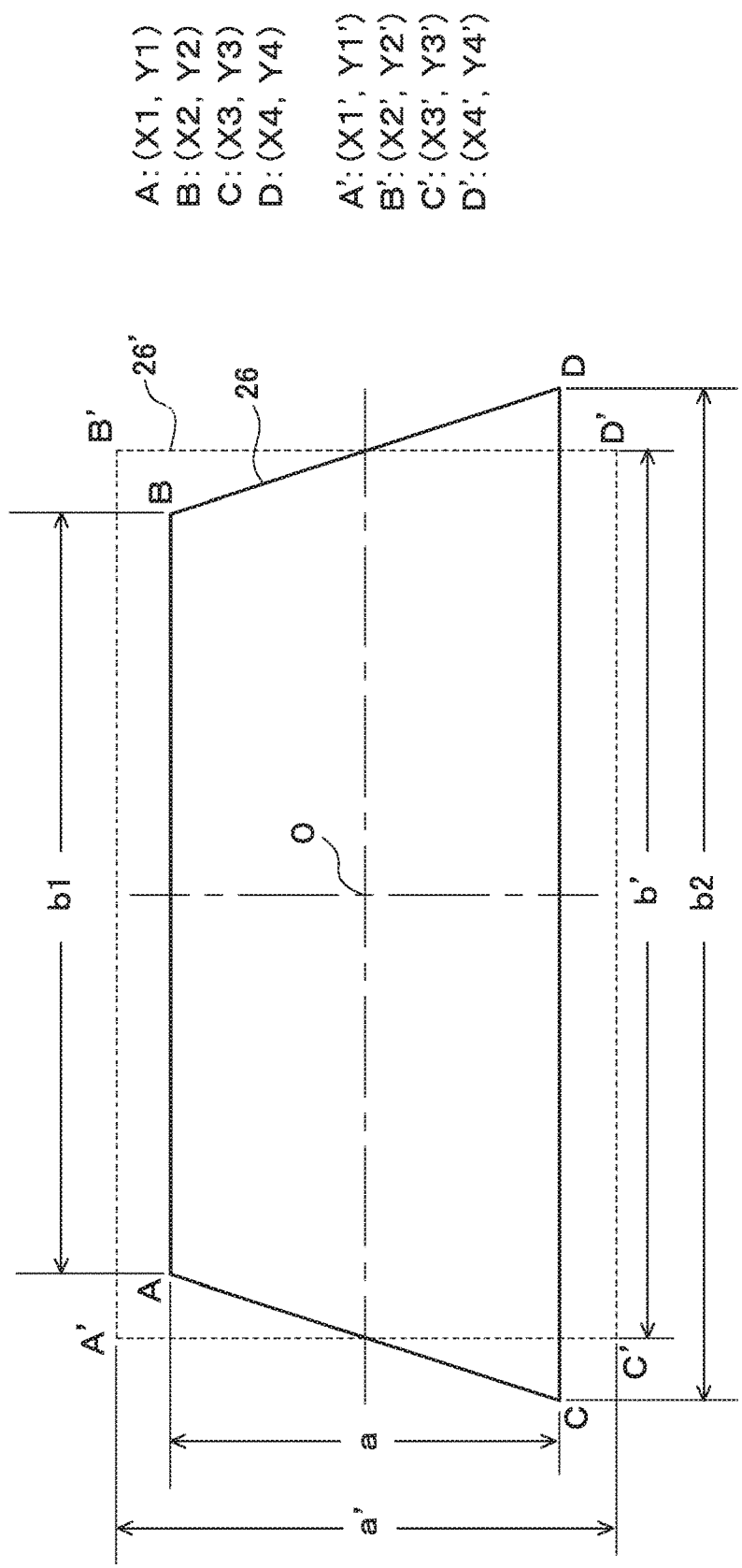
FIG. 15 schematically illustrates the measurement assisting plate fixed to the frame as viewed from a work object point.

The forward inclination angle α of the head can be calculated as follows. FIG. 15 schematically illustrates the measurement assisting plate 26 on the first image obtained by photographing, from the work object point P, the face of the user who looks at the work object point P in a near vision state in the working posture. As described above, the near line-of-sight direction of the user is inclined downward by the downward inclination angle r with respect to the front view direction, so that the measurement assisting plate 26 denoted by the continuous line of FIG. 15 looks like a trapezoidal shape in which the upper side thereof is shorter than the lower side. It is assumed here that the coordinate positions of respective four vertexes A, B, C, and D that the central control section 43 detects on the image are (X1, Y1), (X2, Y2), (X3, Y3), and (X4, Y4), respectively.

Further, it is assumed here that a virtual measurement assisting plate 26' whose plane faces directly forward with respect to the work object point P is disposed such that the center point O coincides with the center point of the actual measurement assisting plate 26. In FIG. 15, the virtual measurement assisting plate 26' is denoted by the dashed line. In this case, the lateral widths of the actual and virtual measurement assisting plates 26 and 26' at the center point O are equal to each other. It is assumed that the coordinate positions of respective four vertexes A', B', C', and D' of the measurement assisting plate 26' are (X1', Y1'), (X2', Y2'), (X3', Y3'), and (X4', Y4'). Since the actual dimensions of the measurement assisting plate 26 are previously input to the computer 23, the central control section 43 can calculate the coordinate positions of the respective four vertexes A', B', C', and D' from the input actual dimensions.

Thus, the height dimension a of the trapezoidal measurement assisting plate 26 displayed on the first image, the length b1 of the upper side thereof, and the length b2 of the lower side thereof are represented as follows:

$$a = Y1 + Y3$$

$$b1 = X1 + X2$$

$$b2 = X3 + X4$$

On the other hand, the length a' of the vertical side of the original rectangular measurement assisting plate 26 and length b' of the horizontal side thereof are represented as follows:

$$a' = Y1' + Y3'$$

$$b' = X1' + X2'$$

The forward inclination angle α can be calculated according to the following expression using the values b1, b2, a', and b', where M denotes the linear distance between the work object point P and the center point O of the measurement assisting plate 26:

$$\alpha = \sin^{-1}\{(1/b1 - 1/b2) \times b'/a' \times M\}$$

Details of this expression will be described below.

Figure 16:
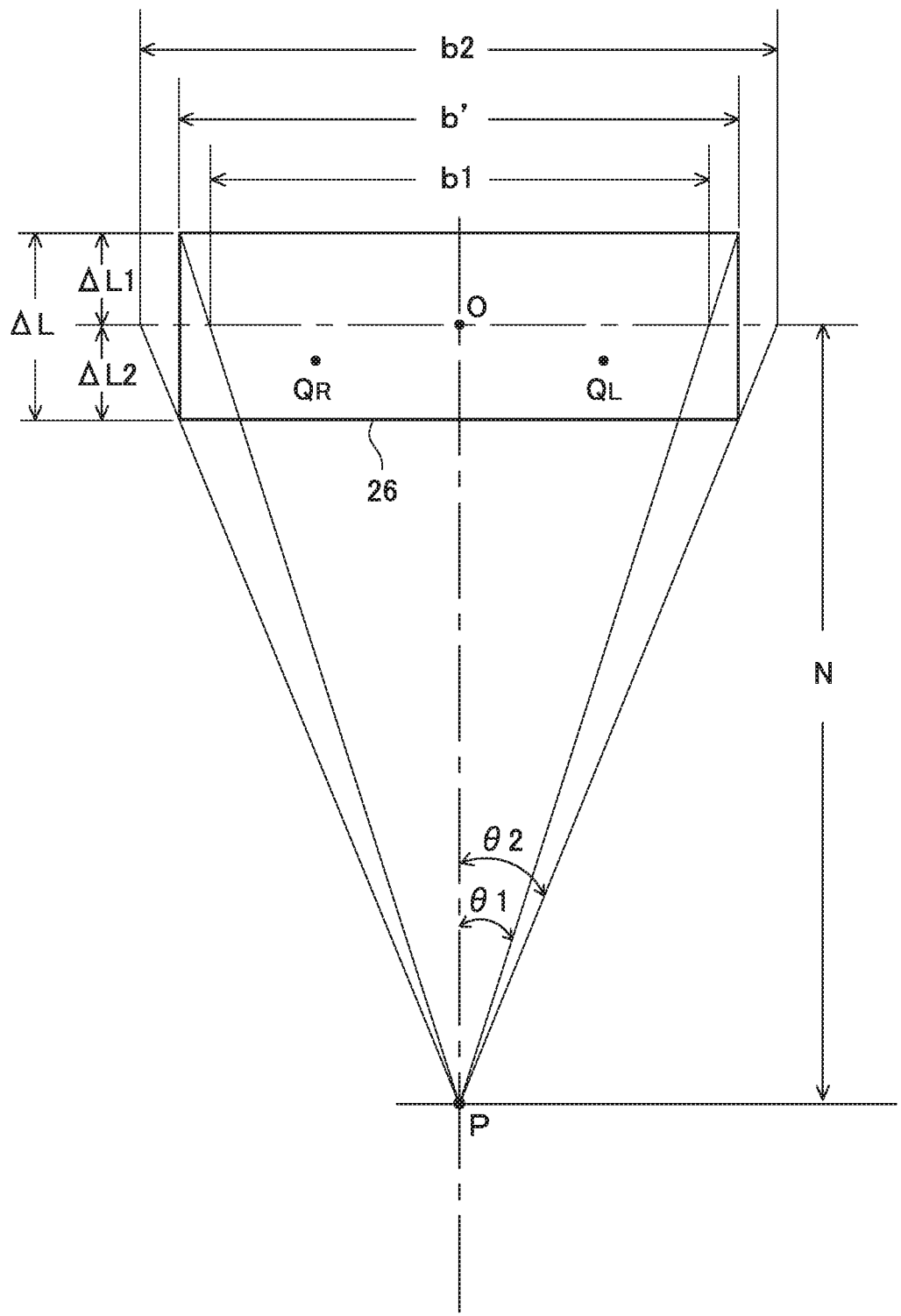
FIG. 16 is an explanatory view of the image of FIG. 15 as viewed from above.
Figure 17:
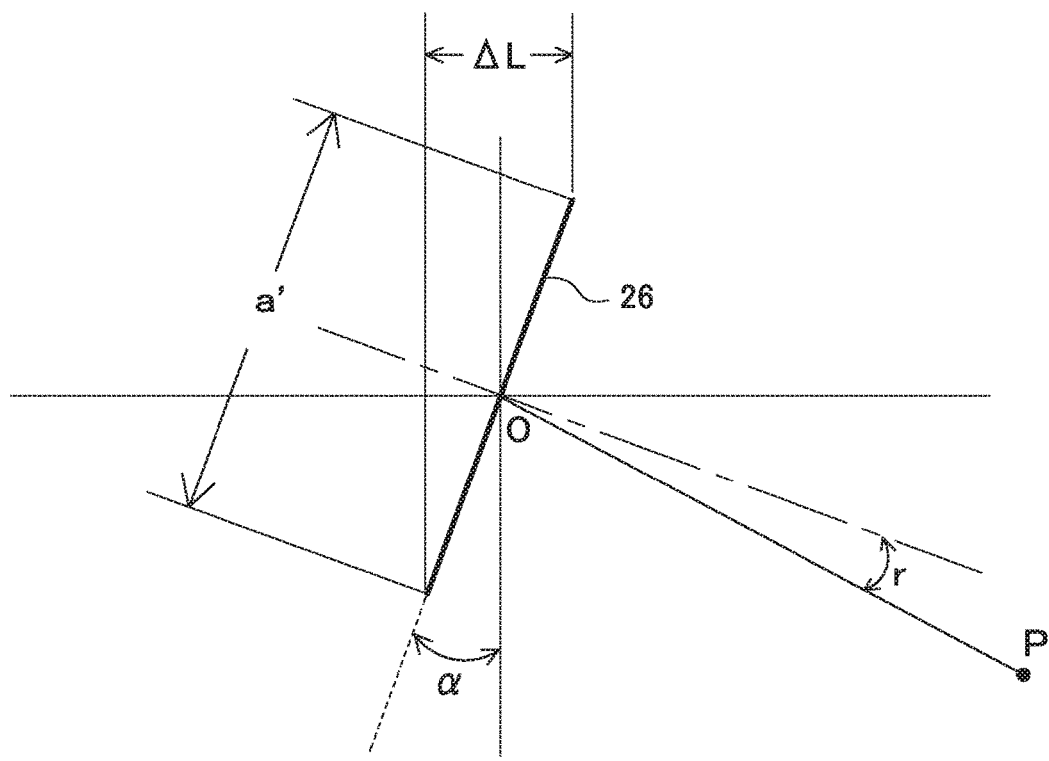
FIG. 17 is an explanatory view of the image of FIG. 15 as viewed from a side.

FIG. 16 is a plan view of the measurement assisting plate 26 fixed to the frame 25 that the user who looks at the work object point P in the working posture wears as viewed from right above, and FIG. 17 is a view of the measurement assisting plate 26 as viewed from the right side.

(1) Assuming that the horizontal length of the vertical side having the length a' in an inclined state is ΔL when the measurement assisting plate 26 is inclined forward, the forward inclination angle α is represented by the following expression:

$$\alpha = \sin^{-1}(\Delta L/a')$$

(2) Here, a' is a known value, so that when ΔL is divided into ΔL1 and ΔL2 at the center point O of the measurement assisting plate 26, the following relationship is satisfied (FIG. 16):

$$\tan \theta 1 = (b1/2)/N = (b'/2)/(N + \Delta L1)$$

$$\therefore \Delta L1 = (b'/b1 - 1) \times M$$

$$\tan \theta 2 = (b2/2)/N = (b'/2)/(N - \Delta L2)$$

$$\therefore \Delta L2 = (1 - b'/b2) \times N$$

(3) Thus, ΔL can be calculated as follows:

$$\Delta L = \Delta L1 + \Delta L2$$

$$= \{(b'/b1 - 1) + (1 - b'/b2)\} \times N$$

$$= \{(1/b1 - 1/b2) \times b' \times N\}$$

(4) As a result, the above expression (1) for calculating the forward inclination angle α is satisfied as follows:

$$\alpha = \sin^{-1}(\Delta L/a)$$

$$= \sin^{-1}\{(1/b1 - 1/b2) \times b'/a' \times N\}$$

As described above, according to the present embodiment, the forward inclination angle α and angle β can thus be calculated, so that the downward inclination angle r can be calculated according to the following expression:

$$r = \beta - \alpha$$

Figure 18:
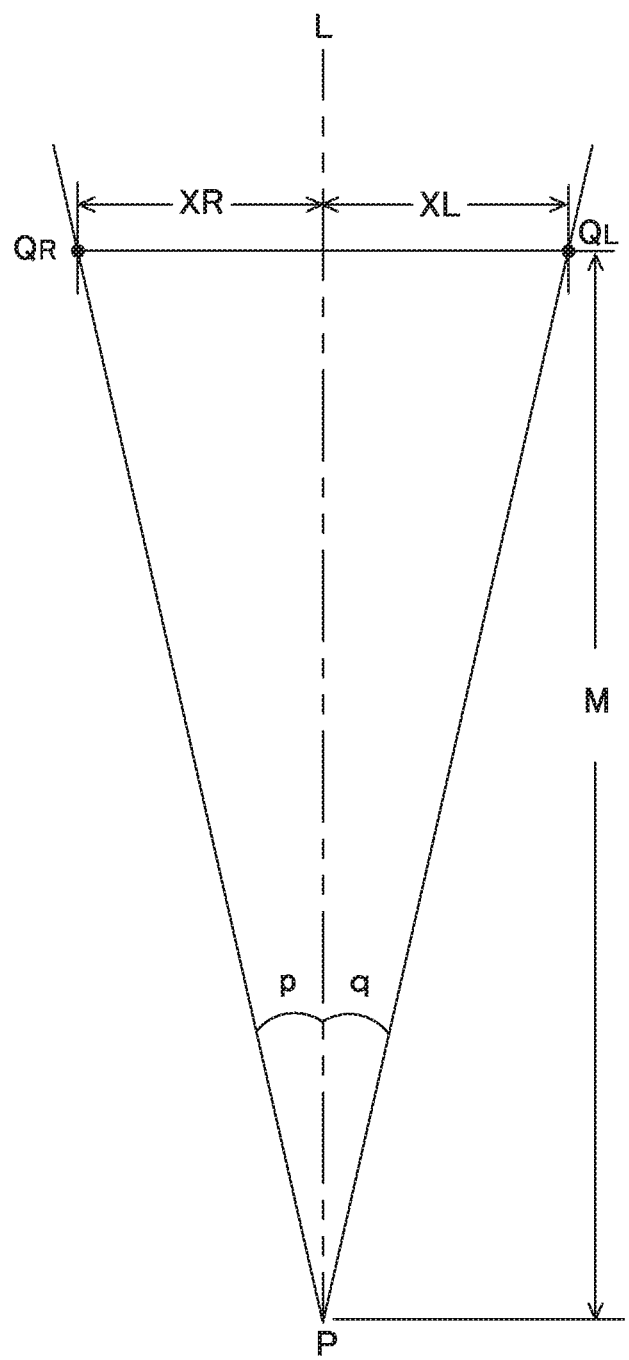
FIG. 18 is an explanatory view explaining how to calculate inward inclination angles of left and right pupils.

The inward inclination angles p and q of the left and right loupes can be calculated as follows. In FIG. 18, it is assumed that distances from a right pupil center position QR and left pupil center position QL of the user to the center point O of the measurement assisting plate 26 in the X-direction (horizontal direction) are XR and XL, respectively. These X-direction distances XR and XL are kept unchanged when the user faces forward or downward.

The computer 23 can calculate the distances XR and XL from the coordinates of the above-mentioned respective left and light pupil center positions. Thus, the inward inclination angles p and q of the left and right loupes are as follows:

$$p = \tan^{-1}(M/XR)$$

$$q = \tan^{-1}(M/XL)$$

Then, the attachment positions of the left and right loupes to the carrier lens 4 are determined. As described below, the attachment positions of the left and right loupes are determined by calculating the left and right pupil center positions on the measurement assisting plate 26. The left and right pupil center positions on the measurement assisting plate 26 are calculated by the computer 23 applying arithmetic processing to the first image obtained by the first photographing and second image obtained by the second photographing.

Figure 19:
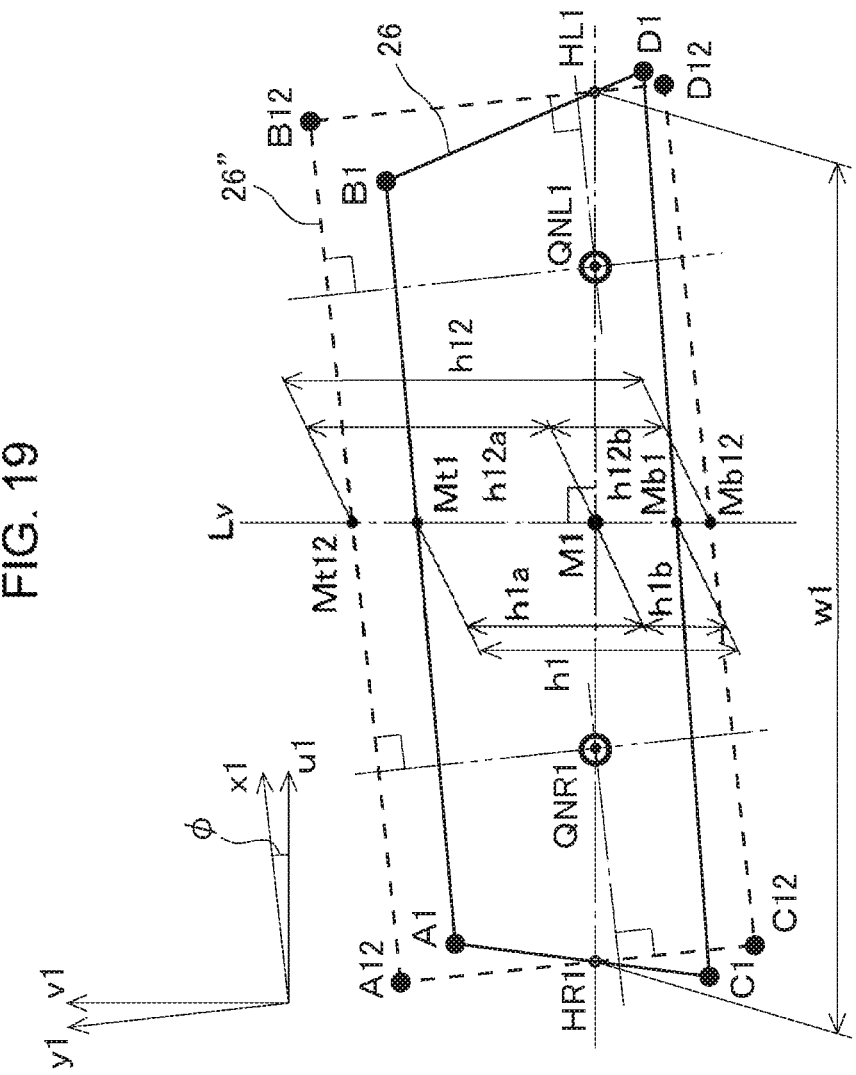
FIG. 19 schematically illustrates a first image.

FIG. 19 schematically illustrates the measurement assisting plate 26 on the first image. In FIG. 19, on the first image, left and right pupil centers QNL1 and QNR1 of the user who looks at the work object point P in the working posture (i.e., in a near vision state), are positioned within the frame of the measurement assisting plate 26. The computer 23 assumes that the left and right pupil centers QNL1 and QNR1 are recognized on the plane of the measurement assisting plate 26.

As described above in relation to the conventional techniques, a human's face is not symmetrical, so that, actually in many cases, as illustrated, the frame 25 is somewhat inclined to the left or right even when the left and right eyes are the same in height (i.e., horizontally positioned). Thus, in the present embodiment, on the assumption that the left and right eyes are horizontally positioned and that the frame 25 is inclined to the left or right, the computer 23 processes the image data to calculate the left and right pupil centers QNL1 and QNR1. The same approach is taken in the following processing for the second image obtained by the second photographing.

Even if both eyes of the user are actually horizontal to each other, the left and right pupil centers QNL1 and QNR1 on the image may not be the same in height depending on the set-up state of the camera 22 at photographing. In such a case, in the present embodiment, the image displayed on the screen of the computer 23 is rotated in a plane to perform correction so that the left and right pupil centers QNL1 and QNR1 become the same in height, followed by processing of the resultant image data. Also in this case, the same approach is taken in the following processing for the second image obtained by the second photographing.

In FIG. 19, an orthogonal coordinate system having a horizontal straight line passing through the left and right pupil centers QNL1 and QNR1, i.e., a horizontal axis parallel to the bipupillar line and a vertical axis orthogonal to the horizontal axis is referred to as u1v1 coordinate system. Further, an orthogonal coordinate system having a horizontal axis corresponding to the left-right inclination of the frame 25 and a vertical axis orthogonal to the inclined horizontal axis is referred to as x1y1 coordinate system. As illustrated, the x1y1 coordinate system is obtained by rotating the u1v1 coordinate system by an angle φ1.

In FIG. 19, while the frame 25 is inclined to the left or right, the measurement assisting plate 26 is displayed in a trapezoidal shape in which the upper side thereof is shorter than the lower side as described above in relation to FIG. 15. The computer 23 recognizes four vertexes A1, B1, C1, and D1 of the trapezoid and left and right pupil centers QNL1 and QNR1 and determines the coordinate positions thereof, respectively, according to the scale for the u1v1 coordinate system set on the screen as follows:

$$A1 = (UA1, VA1)$$

$$B1 = (UB1, VB1)$$

$$C1 = (UC1, VC1)$$

$$D1 = (UD1, VD1)$$

$$QNL1 = (UQNL1, VQNL1)$$

$$QNR1 = (UQNR1, VQNR)$$

Further, on the image of FIG. 19, the computer 23 recognizes a midpoint M1 between two points HL1 and HR1 at which the bipupillar line crosses both sides of the trapezoidal measurement assisting plate 26, recognizes two pints Mt1 and Mb1 at which a vertical line Lv passing through the midpoint M1 of the bipupillar line crosses the upper and lower sides of the trapezoidal measurement assisting plate 26, and determines the coordinate positions thereof, respectively in the u1v1 coordinate system according to the scale for the u1v1 coordinate system as follows:

$$M1 = (UM1, VM1)$$

$$MT1 = (UMT1, VMT1)$$

$$MB1 = (UMB1, VMB1)$$

Figure 20:
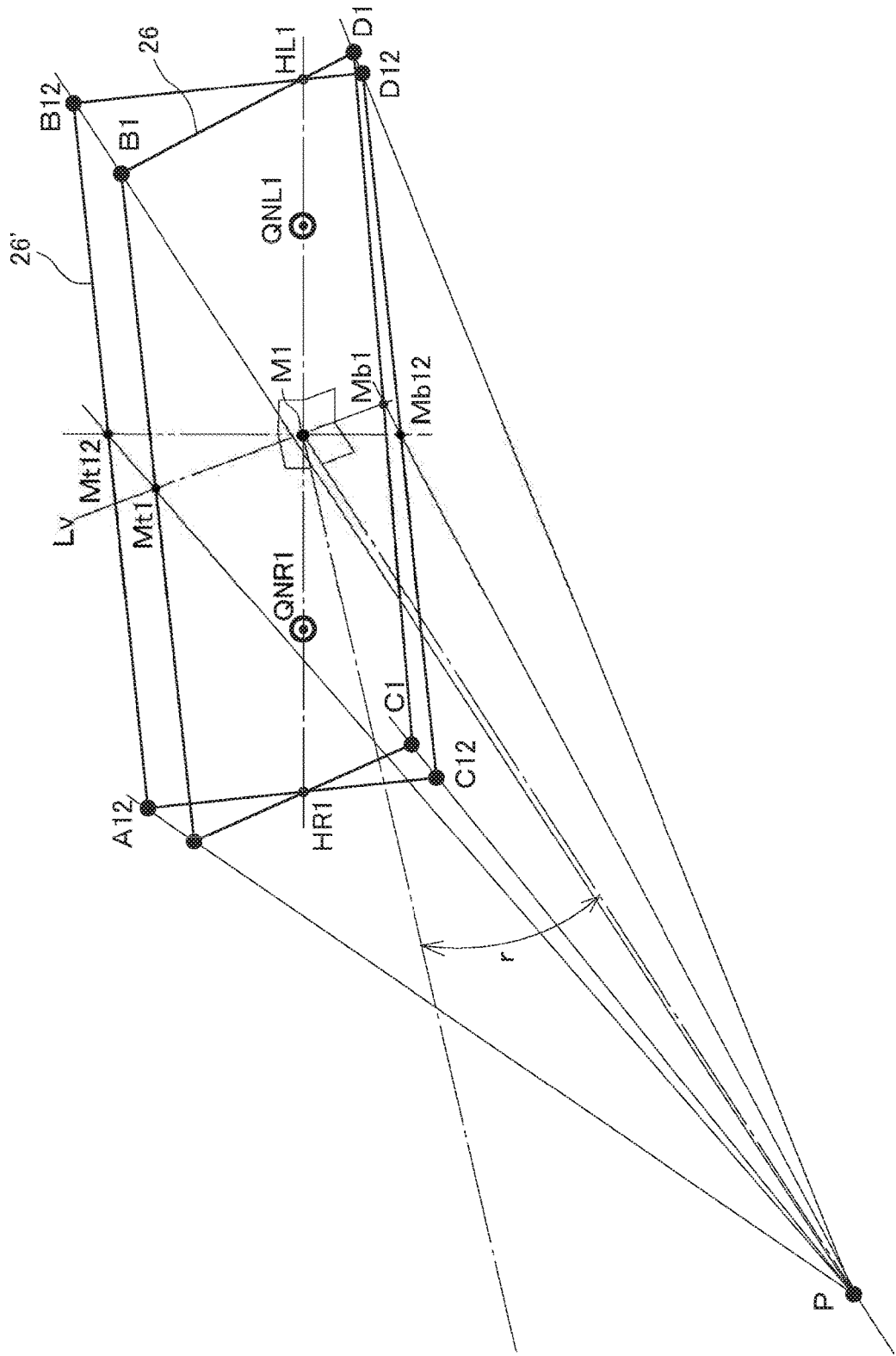
FIG. 20 is an explanatory view illustrating projection of the measurement assisting plate on the first image plane.

Here, the measurement assisting plate 26 before being projected on the plane image of FIG. 19 in a trapezoidal shape, that is, the actual rectangular measurement assisting plate 26 is considered. In this case, as illustrated in FIG. 20, the trapezoidal measurement assisting plate 26 can be regarded as a projected image obtained by rotating, with the bipupillar line as a rotation center axis, the actual rectangular measurement assisting plate 26″ by the downward inclination angle r such that the upper and lower sides thereof are directed rearward and forward, respectively. Thus, the coordinate positions of the left and right pupil centers QNL1 and QNR1 are the same in both the trapezoidal measurement assisting plate 26 and actual rectangular measurement assisting plate 26″. In FIG. 20, reference character Lp1 is a vertical line perpendicular to the plane of the measurement assisting plate 26 of the trapezoid A1B1C1D1 through the midpoint M1 and towards the operation point P, and reference character Lp12 is a vertical line perpendicular to the plane of the measurement assisting plate 26″ of the rectangle A12B12C12D12 through the midpoint M1.

Thus, in the present embodiment, the relationship between the coordinate positions of the respective four vertexes A1, B1, C1, and D1 of the trapezoidal measurement assisting plate 26 recognized on the plane image of FIG. 19 and the coordinate positions of respective four vertexes A12, B12, C12, and D12 of the actual rectangular measurement assisting plate 26″ obtained by three-dimensionally rotating the trapezoidal measurement assisting plate 26 is derived in a computable form by the computer 23. As a result, in FIG.

19, the coordinate positions of the respective left and right pupil centers QNL1 and QNR1 which are points on the trapezoidal measurement assisting plate 26 are converted into points on the rectangular measurement assisting plate 26".

Figure 21:
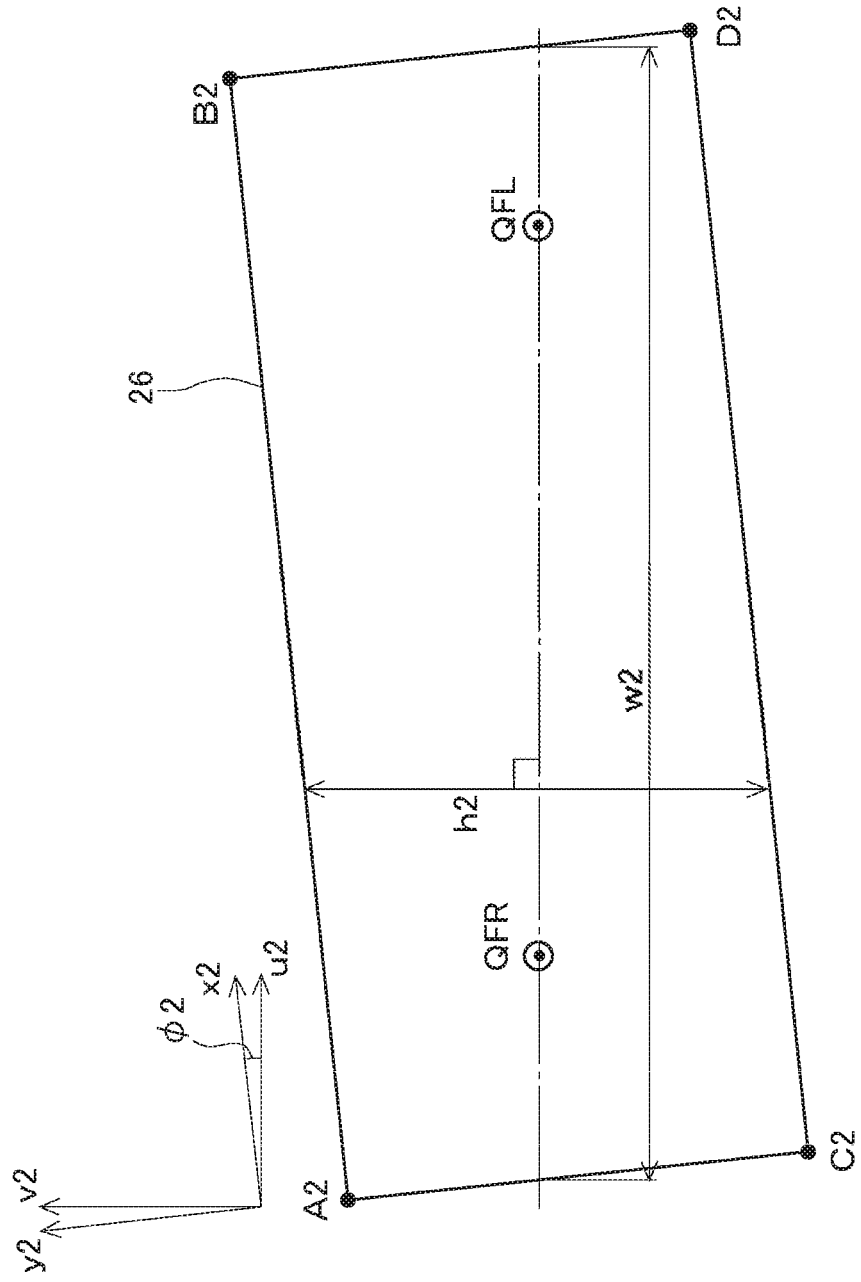
FIG. 21 schematically illustrates a second image.

FIG. 21 schematically illustrates the measurement assisting plate 26 in the second image. In FIG. 12, left and right pupil centers QFL and QFR recognized on the plane of the measurement assisting plate 26 of the user who views forward in a far vision state in an upright posture in which his or her head is held straight up in the second photographing are shown within the frame of the measurement assisting plate 26. As in the first image, in the second image illustrated in FIG. 21, the bipupillar line that is a straight line, passing through the left and right pupil centers QFL and QFR, is horizontally oriented.

The second image is obtained by photographing the frame from right in front, so that the measurement assisting plate 26 illustrated in FIG. 21 has a rectangular shape. In FIG. 21, an orthogonal coordinate system having a horizontal axis parallel to the bipupillar line passing through the left and right pupil centers QFL and QFR and a vertical axis orthogonal to the horizontal axis is referred to as u2v2 coordinate system. Further, an orthogonal coordinate system having a horizontal axis parallel to the upper and lower sides of the frame 25 and a vertical axis parallel to the left and right sides thereof is referred to as x2y2 coordinate system. As illustrated, the x2y2 coordinate system is obtained by rotating the u2v2 coordinate system by an angle $\phi 2$.

The computer 23 recognizes four vertexes A2, B2, C2, and D2 of the measurement assisting plate 26 and left and right pupil centers QFL and QFR and determines the coordinate positions thereof, respectively, in the u2V2 coordinate system according to the scale for the u2v2 coordinate system set on the screen as follows:

$A2=(UA2,VA2)$ $B2=(UB2,VB2)$ $C2=(UC2,VC2)$ $D2=(UD2,VD2)$ $QFL=(UQFL,VQFL)$ $QFR=(UQFR,VQFR)$

The coordinate positions of the respective vertexes A2, B2, C2, and D2 and coordinate positions of the left and right pupil centers QFL and QFR in the x2y2 coordinate system are represented as follows:

$A2=(XA2,YA2)$ $B2=(XB2,YB2)$ $C2=(XC2,YC2)$ $D2=(XD2,YD2)$ $QFL=(XQFL,YQFL)$ $QFR=(XQFR,YQFR)$

The above coordinate positions in the x2y2 coordinate system are calculated by the computer 23 applying coordinate conversion to the coordinate positions in the u2v2 coordinate system using, e.g., the following determinant. The angle $\phi 2$ in the following Numeral 1 is the angle of rotation from the u2v2 coordinates to x2y2 coordinates.

[Numeral 1]

|  | u2 | v2 |
|---|---|---|
| x2 | $\cos\phi 2$ | $\sin\phi 2$ |
| y2 | $-\sin\phi 2$ | $\cos\phi 2$ |

Thus, when the vertex A2 is set as a reference point, the positions of the left and right pupil centers QFL and QFR in a far vision state are calculated as follows:

$QFL=(XQFL-XA2,YQFL-YA2)$ $QFR=(XQFR-XA2,YQFR-YA2)$

For example, the length of the upper side (lower side) of the measurement assisting plate 26 on the image of FIG. is calculated from the coordinate positions of the respective vertexes A2 and B2. Since the length of the upper side of the actual measurement assisting plate 26 is previously known, the scaled size of the measurement assisting plate 26 in FIG. 21 is calculated. Thus, the positions of the left and right pupil centers QFL and QFR on the actual measurement assisting plate 26 can be determined from the coordinate positions in FIG. 21.

The following describes how to convert the coordinate positions of the respective left and right pupil centers QNL1 and QNR1 on the trapezoidal measurement assisting plate 26 in FIG. 19 into the points on the rectangular measurement assisting plate 26" in FIG. 19.

In one embodiment, it is assumed that the actual rectangular measurement assisting plate 26" is rotated, with the bipupillar line (HR1-HL1) as a rotation center axis, to a plane corresponding to the trapezoidal measurement assisting plate 26 by the downward inclination angle r in the direction opposite to the above such that the upper and lower sides thereof are directed forward and rearward, respectively. In FIG. 19, the thus assumed virtual rectangular measurement assisting plate 26" is denoted by the dashed line. The virtual rectangular measurement assisting plate 26" is disposed so as to overlap the trapezoidal measurement assisting plate 26 with the plane thereof facing directly forward with respect to the work object point P and with the bipupillar line thereof coinciding with that of the trapezoidal measurement assisting plate 26. As illustrated, the points at which the bipupillar line crosses the both sides of the virtual rectangular measurement assisting plate 26" coincide with the respective points HL1 and HR1 on the both sides of the trapezoidal measurement assisting plate 26.

Then, the computer 23 determines a length h1a between the two points Mt1 and M1 on the vertical line Lv and a length h1b between the two points M1 and Mb1 thereon according to the scale on the screen and calculates the ratio of the lengths (h1a:h1b=m). Further, assuming that two points at which the vertical line Lv crosses the upper and lower sides of the virtual rectangular measurement assisting plate 26" are Mt12 and Mb12, the ratio of the lengths (h12a and h12b) between the two points (Mt12 and Mb12) and midpoint M1 is m, which is the same as the ratio of h1a:h1b.

The length h12 between the two points Mt12 and Mb12 can be calculated from the scaled size of the measurement assisting plate 26" of FIG. 19 with respect to the measurement assisting plate 26 of FIG. 21. A length h2 between the upper and lower sides of the measurement assisting plate 26 in the u2v2 coordinate system of FIG. 21 and a length w2 between the left and right sides thereof can be easily calculated using an angle $\theta$ of rotation from the u2v2 coordinates to x2y2 coordinates. Thus, the length h12 can be easily calculated from the length h2 based on the ratio between the lengths w2 and w1 in the horizontal direction.

Thus, the coordinate positions of the respective points Mt1 and Mb1 on the upper and lower sides of the measurement assisting plate 26" of FIG. 19 are calculated. The thus calculated coordinate positions of the respective points Mt1 and Mb1, midpoint M1, and left and right pupil centers QNL1 and QNR1 in a near vision state in the u1v1 coordinate system are converted into those in the x1y1 coordinate system. This conversion can be easily carried out using the following determinant in Numeral 2.

[Numeral 2]

|    | u1      | v1     |
|----|---------|--------|
| x1 | cos$\phi$1  | sin$\phi$1 |
| y1 | −sin$\phi$1 | cos$\phi$1 |

The coordinate positions of the respective A1, B1, C1, and D1 in the x1y1 coordinate system can be easily calculated from the coordinate positions of the respective Mt1, Mb1, and M1 after coordinate conversion. Thus, for example, when the vertex A1 is set as a reference point, the positions of the left and right pupil centers QNL1 and QNR1 on the measurement assisting plate 26" in a near vision state are calculated as follows:

$QNL1=(XQFL-XA1, YQFL-YA1)$ $QNR1=(XQFR-XA1, YQFR-YA1)$

Further, since the scaled size of the measurement assisting plate 26" of FIG. 19 with respect to the actual measurement assisting plate 26 is previously known, the left and right pupil center positions on the actual measurement assisting plate 26 in a near vision state can be determined from the coordinate positions of the respective pupil centers QNL1 and QNR1.

In another embodiment, the actual rectangular measurement assisting plate 26 before being projected in a trapezoidal shape on the plane image of FIG. 19 is reconstructed to a three-dimensional image on the software of the computer 23 using the four vertexes A1, B1, C1, and D1 in the trapezoidal of FIG. 19. As a result, the coordinate positions of the respective pupil centers QNL1 and QNR1 on FIG. 19 can be converted directly into the coordinate positions on the three dimensional image, i.e., actual rectangular measurement assisting plate 26".

This coordinate conversion is executed as follows. First, from the photographed image of FIG. 19, the coordinate positions of the respective four vertexes A1, B1, C1, and D1 of the trapezoidal measurement assisting plate 26 and coordinate positions of the respective pupil centers QNL1 and QNR1 are calculated. These coordinate positions can be determined according to, e.g., the number of pixels constituting the screen.

The coordinate positions of the respective four vertexes A1, B1, C1, and D1 of the measurement assisting plate 26 when the actual measurement assisting plate 26 is viewed as a rectangle from right in front are previously known from the actual dimension of the trapezoidal measurement assisting plate 26. Thus, in a so-called pinhole camera model, a conversion matrix T that converts the rectangular image of the measurement assisting plate 26 facing forward into the trapezoidal image of FIG. 19 using a known function that performs perspective projection conversion of projecting three-dimensional coordinate points on an image plane.

Then, an inverse conversion matrix $T^{-1}$ of the calculated conversion matrix T is calculated. Using the calculated inverse conversion matrix, the coordinate positions of the respective pupil centers QNL1 and QNR1 in the rectangular measurement assisting plate 26" facing forward are calculated from the coordinate positions of the respective pupil centers QNL1 and QNR1 in the trapezoidal measurement assisting plate 26 of FIG. 19.

For example, "findHomography function" is known as such a known function. The following Numeral 3 is represented using the findHomography function. This is a relational expression between coordinates (u1, v1) on the first image plane and coordinates (u', v') on the plane including the measurement assisting plate 26" in the three-dimensional coordinate system before projection on the first image plane.

$$s\begin{pmatrix} u' \\ v' \\ 1 \end{pmatrix} = T\begin{pmatrix} u1 \\ v1 \\ 1 \end{pmatrix} = \begin{pmatrix} i11 & i12 & i13 \\ i21 & i22 & i23 \\ i31 & i32 & - \end{pmatrix}\begin{pmatrix} u1 \\ v1 \\ 1 \end{pmatrix}$$ [Numeral 3]

Of course, according to the present invention, various functions other than the findHomography function or calculation expressions can be employed as long as the perspective projection conversion of projecting three-dimensional coordinate points on an image plane is performed.

According to still another embodiment, based on the thus calculated coordinate positions of the respective vertexes of the rectangular measurement assisting plate 26" and coordinate positions of the respective vertexes of the trapezoidal measurement assisting plate 26, the angle of rotation about the bipupillar line (HR1-HL1) between a plane including the measurement assisting plate 26" and a plane including the trapezoidal measurement assisting plate in FIG. 20 can be calculated by the computer 23. This rotation angle coincides with the downward inclination angle r.

The following relational expression of Numeral 4 is satisfied between the coordinates (u' and v') of the plane including the measurement assisting plate 26" in FIG. 20 and coordinates (u1, v1) of the first image obtained by rotating the plane including the measurement assisting plate 26" by an angle r about the bipupillar line (HR1-HL1).

$$R(r) = \begin{pmatrix} 1 & 0 & 0 & 0 \\ 0 & \cos r & -\sin r & 0 \\ 0 & \sin r & \cos r & 0 \\ 0 & 0 & 0 & 1 \end{pmatrix}$$ [Numeral 4]

Thus, the angle r can be obtained by calculating sin r or cos r in the Numeral 4 from the coordinate positions of the respective vertexes of the measurement assisting plate 26" and coordinate positions of the respective vertexes of the trapezoidal measurement assisting plate 26.

In step S6, for example, an NC working machine is used to form the loupe attachment hole in the carrier lens 4. The NC working machine previously stores a loupe attachment hole processing program. The downward inclination angle r, inward inclination angles p and q, and loupe attachment position on the carrier lens determined in Steps S4 and S5 are input to the NC working machine, and the frame 25 is set at a predetermined position. Then, the carrier lens 4 is automatically processed to thereby form the loupe attachment hole at a desired position and in a desired direction with accuracy.

Figure 2A:
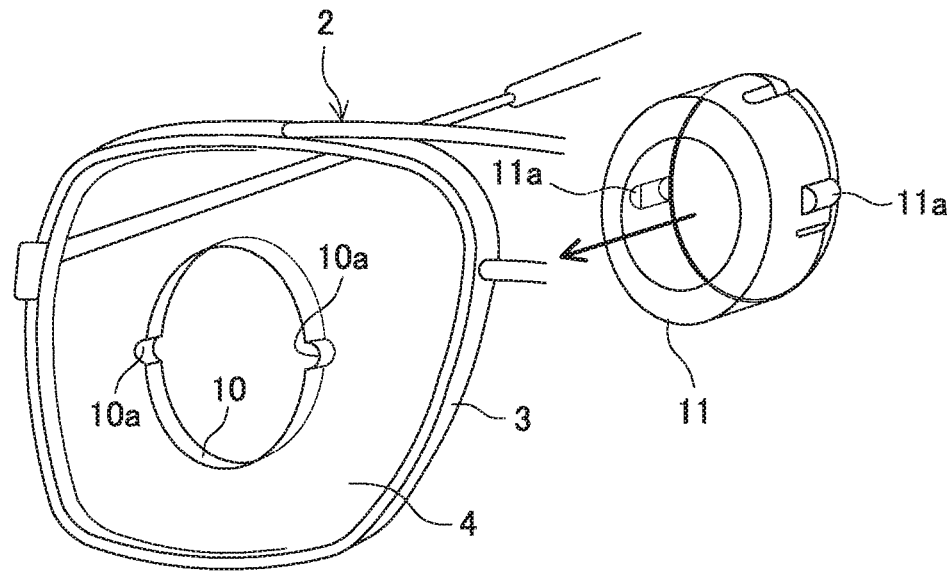
FIGS. 2A and 2B are explanatory views each illustrating a loupe attachment structure and a loupe attachment procedure in the binocular loupe device of FIG. 1.
Figure 2B:
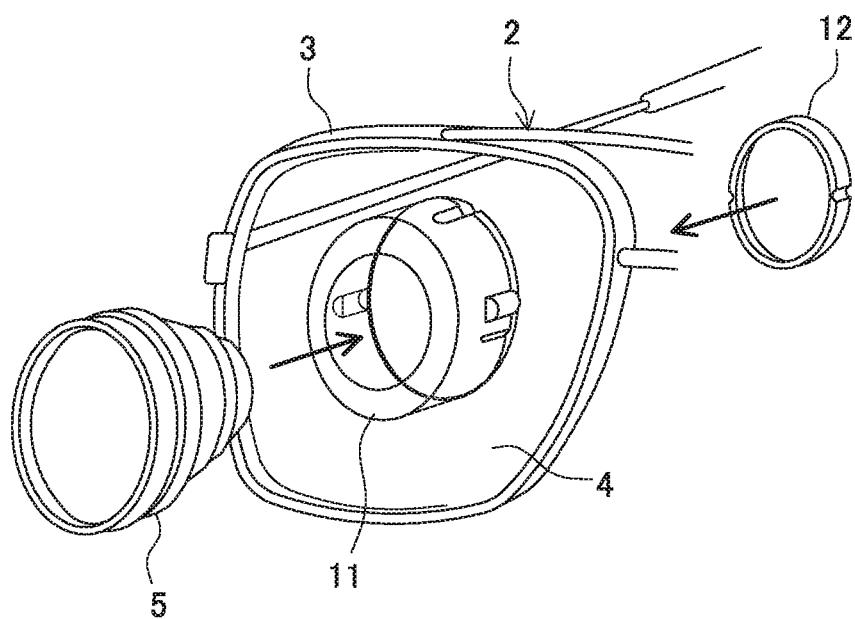
Figure 3:
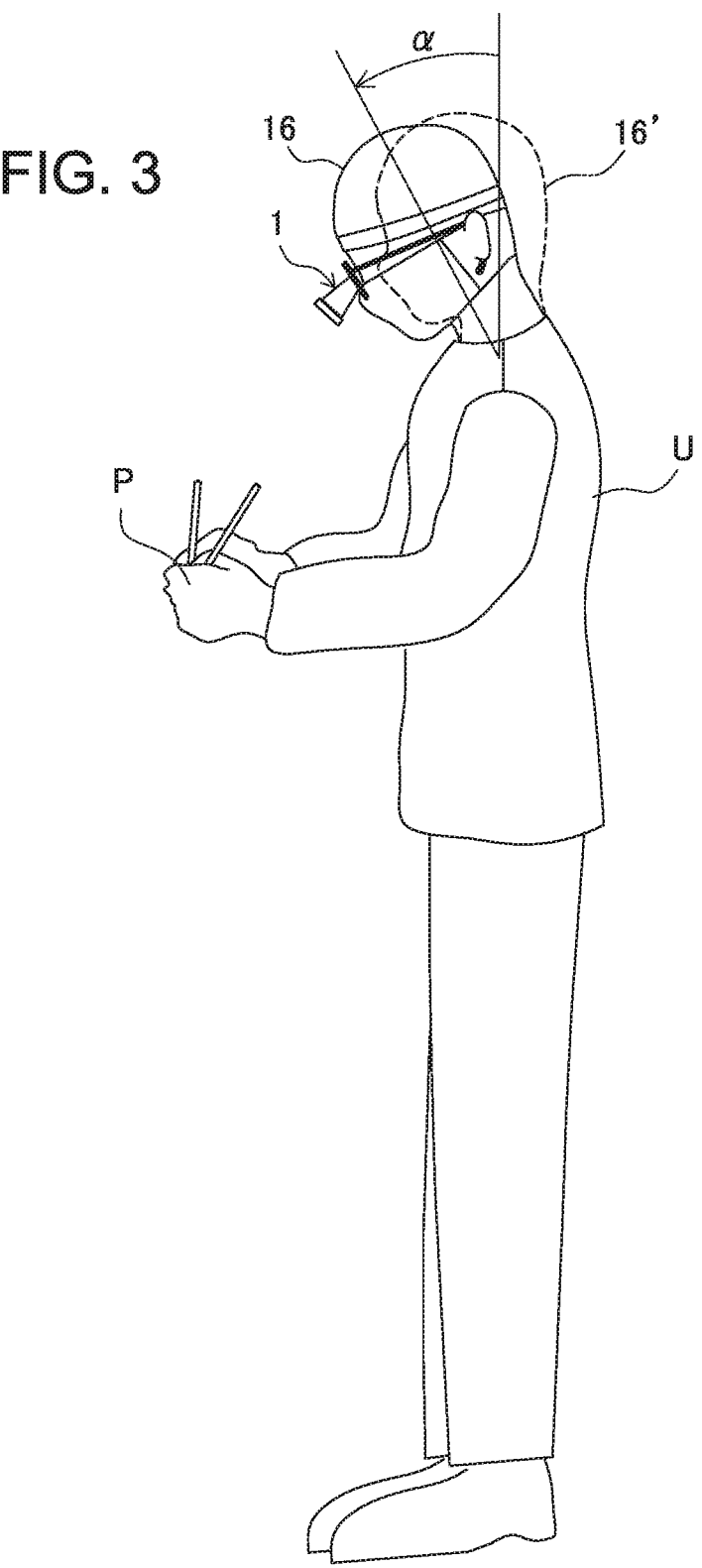
FIG. 3 is an explanatory view schematically illustrating the working posture of a user wearing the binocular loupe device.

In Step S7, the left and right loupes can be fixed to the corresponding carrier lenses using the attachment part (FIGS. 2A and 2B) including the attachment adapter 11 and loupe fixing ring 12. As illustrated in FIGS. 2A and 2B, the attachment adapter 11 is inserted into the loupe attachment hole 10 of the carrier lens 4 from the back side (user's face side) of the carrier lens 4 to be fixed. As illustrated in FIG. 2A, a plurality of (two, in the present embodiment) cuts 10a are formed in the inner peripheral edge of the loupe attachment hole 10, and projections 11a projecting from the outer peripheral surface of the attachment adapter 11 are fitted to the corresponding cuts 10a. By fitting the attachment adapter 11 in this manner, the center axis of each attachment adapter 11 can be made to coincide with the downward inclination angle r and inward inclination angles p or q with respect to the carrier lens 4.

The loupe 5 is inserted into the through hole of the attachment adapter 11 with its rear end portion (eyepiece side) facing the front side of the carrier lens 4, and the loupe fixing ring 12 inserted from the back side of the carrier lens 4 is screwed to a threaded part of the outer periphery of the rear end portion of the loupe 5, whereby the loupe 5 is fixed to the carrier lens 4. At this time, the loupe fixing ring 12 is fastened to the loupe 5 while making adjustment such that the optical axis of each loupe matches the downward inclination angle r and inward inclination angles p or q, whereby the loupe 5 can be fixed with higher accuracy to a desired position of the carrier lens 4 at a desired angle. For example, a laser positioner or other known positioning means can be used for the optical axis adjustment of the loupe 5.

In another embodiment, the loupe 5 adjusted in terms of the downward inclination angle r and inward inclination angles p or q can be fixed directly or through the attachment adapter 11 to the loupe attachment hole 10 with an adhesive. Other various known means can be used for fixing the loupe 5 to the carrier lens 4 while adjusting the attachment position and direction.

The present invention can be applied not only to the lens fitting type described in the above embodiment, but also to the binocular loupe devices of other types or those having other structures, such as the front hanging type using a clip or an arm and the headband type described in relation to the conventional techniques. In the case of the front hanging type or headband type, the measurement assisting plate 26 is disposed at a position corresponding to an arm or the like that holds the loupe in such a direction that the plane of the measurement assisting plate is orthogonal to the front view direction of the user. As a result, as in the above embodiment, by processing the image data captured by the camera 22 of the loupe attachment position determination system 21 in the computer 23, it is possible to determine the downward inclination angle r and inward inclination angles p and q and thus to determine the loupe attachment position. In this case, the pupil position on the measurement assisting plate 26 determined by the present invention corresponds to the actual loupe attachment position.

While the present invention has been described in detail in connection to the preferred embodiment thereof, it should be understood that the present invention is not limited to the above embodiment but various alternations or modifications may be made within the technical scope of the invention. For example, when the user who ordinarily uses vision correction glasses wears the binocular loupe device on the vision correction glasses (lenses), a planolens (vanity lens) is used as the carrier lens 4. When the user wears the binocular loupe device without the vision correction glasses, a prescription lens can be used as the carrier lens 4. In this case, a far vision position of the prescription lens can be set according to the pupil positions QFL and QFR measured using the second image captured in step S5.

What is claimed is:

1. A loupe attachment position determination method for determining an attachment position of a pair of left and right loupes to be attached to a holder worn on a head or face of a user so as to correspond to left and right eyes of the user, the method comprising:
    a step of preparing the holder to which a transparent and flat plate member having a substantially rectangular shape is attached such that a plane of the plate member is orthogonal to a far line of sight of the user when the holder is worn;
    a step of acquiring a first image including the whole plate member and left and right pupils of the user in a near vision state within the plane of the plate member by photographing the face of the user, in the near vision state and when the holder is worn at the head or face of the user, from a work object point on near lines of sight of the left and right eyes;
    a step of measuring, on the first image, coordinate positions of respective vertexes of the plate member and coordinate positions of the respective left and right pupils in the near vision state; and
    a step of determining the loupe attachment position and/or a loupe attachment angle on the plane of the plate member by calculating coordinates of points at which the near lines of sight of the user directed toward the work object point pass through the plate member based on the measured coordinate positions of respective vertexes of the plate member and the coordinate positions of the respective left and right pupils,
    wherein in the step of determining the loupe attachment position, coordinate positions of respective vertexes of a virtual plate member before being projected on a plane of the first image, which is obtained by rotating the plate member on the first image about a straight line passing through centers of the left and right pupils such that the plane of the plate member faces directly forward are calculated based on the measured coordinate positions of the respective vertexes of the plate member, and based on the calculated coordinate positions of the respective vertexes of the virtual plate member, the loupe attachment position on the plane of the plate member is determined.

2. The loupe attachment position determination method according to claim 1, further comprising a step of acquiring a second image including the whole plate member and including the left and right pupils of the user in a far vision state within the plane of the plate member by photographing the face of the user, in the far vision state, who wears the holder at the head or face, from a front of the user; and
    a step of measuring, on the second image, coordinate positions of respective vertexes of the plate member and coordinate positions of the respective left and right pupils in the far vision state.

3. The loupe attachment position determination method according to claim 1, wherein
    in the step of determining the loupe attachment position, a conversion matrix for converting three-dimensional coordinate positions of the respective vertexes of the plate member before being projected on the plane of the first image into the coordinate positions of the respective vertexes of the plate member on the plane of the first image is calculated based on the measured coordinate positions of the respective vertexes of the plate member and an actual dimension of the plate member, and an inverse conversion matrix of the conversion matrix is used to calculate the three-dimensional coordinate positions from the coordinate positions of the respective vertexes on the plane of the plate member.

4. The loupe attachment position determination method according to claim 2, wherein in the step of determining the loupe attachment angle, a direct distance between the work object point and the plane of the plate member and a horizontal distance between the work object point and the plane of the plate member are measured, and a downward inclination angle of each of the near lines of sight with respect to a far line of sight of the user is determined based on the direct distance, the horizontal distance, and a forward inclination angle of the head of the user.

5. The loupe attachment position determination method according to claim 1, wherein based on the coordinate positions of the respective vertexes of the plate member on the first image and three-dimensional coordinate positions of the respective vertexes of the plate member before being projected on the plane of the first image, a rotation angle between a plane including the plate member on the first image and a plane including the plate member before being projected on the plane of the first image is calculated to determine a downward inclination angle of each of the near lines of sight with respect to a far line of sight of the user.

6. The loupe attachment position determination method according to claim 4, wherein the direct distance between the work object point and the plane of the plate member and inward approaching amounts of the left and right pupils of the user on the plane of the plate member are measured, and inward inclination angles of the respective left and right eyes are determined based on the measured direct distance and inward approaching amounts.

7. The loupe attachment position determination method according to claim 1, wherein the holder includes a frame worn on the face of the user and a carrier lens fitted to the frame, and
the loupe is attached to the carrier lens.

8. The loupe attachment position determination method according to claim 1, wherein the holder includes a frame worn on the face of the user and a support part extending forward from the frame, and
the loupe is supported by the support part.

9. The loupe attachment position determination method according to claim 2, wherein the holder includes a headband worn on the head of the user and a support part extending forward from the headband, and
the loupe is supported by the support part.

10. A loupe attachment position determination system for determining an attachment position of a pair of left and right loupes to be attached to a holder adapted to be worn on a head or face of a user so as to correspond to left and right eyes of the user, the system comprising:

a transparent and flat plate member having a substantially rectangular shape and attached to the holder such that a plane of the plate member is orthogonal to a far line of sight of the user in which the holder is worn;
a camera; and an arithmetic processing device for processing an image photographed by the camera, wherein when the holder with the plate member is adapted to be worn on the head or face of the user, the camera is operated to photograph the face of the user in a near vision state from a work object point on near lines of sight of the left and right eyes of the user, and the arithmetic processing device
acquires a first image, including the whole plate member and left and right pupils of the user in the near vision state within the plane of the plate member, from the image photographed with the camera,
calculates coordinate positions of respective vertexes of a virtual plate member before being projected on a plane of the first image, which is obtained by rotating the plate member on the first image about a straight line passing through centers of the left and right pupils such that the plane of the plate member faces directly forward based on measured coordinate positions of the respective vertexes of the plate member; and
determines a loupe attachment position on the plane of the plate member based on the calculated coordinate positions of the respective vertexes of the virtual plate member.

11. The loupe attachment position determination system according to claim 10, wherein the arithmetic processing device processes a second image including the whole plate member and including the left and right pupils of the user in a far vision state within the plane of the plate member, which is acquired by photographing, by the camera, the face of the user, in the far vision state and when the holder is worn at the head or face, from the front and measures, on the second image, coordinate positions of respective vertexes of the plate member and coordinate positions of the respective left and right pupils in the far vision state.

12. The loupe attachment position determination system according to claim 10, wherein the arithmetic processing device calculates a conversion matrix for converting three-dimensional coordinate positions of the respective vertexes of the plate member before being projected on the plane of the first image into the coordinate positions of the respective vertexes of the plate member on the plane of the first image based on the measured coordinate positions of the respective vertexes of the plate member and an actual dimension of the plate member and applies an inverse conversion matrix of the conversion matrix to calculate the three-dimensional coordinate positions from the coordinate positions of the respective vertexes on the plane of the plate member.

13. The loupe attachment position determination system according to claim 10, wherein the arithmetic processing device determines a downward inclination angle of the near line of sight with respect to the far line of sight of the user based on a direct distance between the work object point and the plane of the plate member, a horizontal distance between the work object point and the plane of the plate member, and a forward inclination angle of the head of the user.

14. The loupe attachment position determination system according to claim 10, wherein the arithmetic processing device calculates a rotation angle between a plane including the plate member on the first image and a plane including the plate member before being projected on the plane of the first image based on the coordinate positions of the respective vertexes of the plate member on the first image and three-dimensional coordinate positions of the respective vertexes of the plate member before being projected on the plane of the first image to determine a downward inclination angle of each of the near lines of sight with respect to a far line of sight of the user.

15. The loupe attachment position determination system according to claim 10, wherein
the arithmetic processing device determines inward inclination angles of the respective left and right eyes based on a direct distance between the work object point and the plane of the plate member and inward approaching amounts of the left and right pupils of the user on the plane of the plate member.

* * * * *